(12) United States Patent
Bertino

(10) Patent No.: US 10,517,216 B2
(45) Date of Patent: Dec. 31, 2019

(54) CHOPPING MODULE

(71) Applicant: INDÚSTRIAS REUNIDAS COLOMBO LTDA, Pindorama (BR)

(72) Inventor: Luiz Henrique Bertino, Pindorama (BR)

(73) Assignee: INDÚSTRIAS REUNIDAS COLOMBO LTDA, Pindorama (BR)

( * ) Notice: Subject to any disclaimer, the term of this patent is extended or adjusted under 35 U.S.C. 154(b) by 7 days.

(21) Appl. No.: 16/025,500

(22) Filed: Jul. 2, 2018

(65) Prior Publication Data
US 2019/0008092 A1    Jan. 10, 2019

(30) Foreign Application Priority Data

Jul. 4, 2017    (BR) .............................. 132017014468

(51) Int. Cl.
| | | |
|---|---|---|
| *A01D 45/10* | (2006.01) | |
| *A01F 29/00* | (2006.01) | |
| *A01F 29/06* | (2006.01) | |

(52) U.S. Cl.
CPC .............. *A01D 45/10* (2013.01); *A01F 29/06* (2013.01)

(58) Field of Classification Search
CPC ...... A01D 45/10; A01D 45/08; A01D 45/086; A01F 29/06; A01F 29/10; A01F 29/01; A01F 29/02
USPC ................... 56/13.9, 14.3, 14.4, 53, 98, 119, 56/500–504, 364
See application file for complete search history.

(56) References Cited

U.S. PATENT DOCUMENTS

| | | | |
|---|---|---|---|
| 3,141,281 A | 7/1964 | Gaunt et al. | |
| 3,482,690 A | 12/1969 | Driller | |
| 3,599,404 A | 8/1971 | Fernandez et al. | |
| 3,673,774 A | 7/1972 | Mizzi | |
| 3,788,048 A | 1/1974 | Stiff et al. | |
| 3,830,046 A | 8/1974 | Rollitt | |
| 3,848,399 A | 11/1974 | Makeham | |
| 3,851,450 A * | 12/1974 | Nelson ................... A01F 29/06 56/14.4 |
| 3,958,397 A | 5/1976 | Stiff | |
| 4,019,308 A | 4/1977 | Quick | |
| 4,065,912 A | 1/1978 | Quick | |
| 4,121,778 A | 10/1978 | Quick | |

(Continued)

FOREIGN PATENT DOCUMENTS

| | | |
|---|---|---|
| BR | PI 7605903 | 4/1978 |
| BR | PI 7606656 | 5/1978 |

(Continued)

*Primary Examiner* — Robert E Pezzuto
(74) *Attorney, Agent, or Firm* — B. Aaron Schulman, Esq.; Stites & Harbison, PLLC

(57) ABSTRACT

A chopping module is provided that is designed for grasping and pulling plants by pushing them between a rotating knife set and chopping them into billets, wherein the rotating knife set has a cylindrical form with its length divided into at least two sections, wherein various cutting segments are distributed, each one extending itself in each lengthwise section formed between the discs wherein the segments of a section are lagged or are not lengthwise aligned to those of the adjacent section. This module is advantageous in that it allows for considerable reduction of the cutting forces or pressure, and consequently allows for smooth operation and considerably increased working life of the module.

3 Claims, 27 Drawing Sheets

(56) References Cited

U.S. PATENT DOCUMENTS

| | | | |
|---|---|---|---|
| 4,295,325 A | 10/1981 | Cannavan | |
| 4,505,434 A * | 3/1985 | Martenas | A01F 29/06 |
| | | | 241/101.76 |
| 4,747,260 A * | 5/1988 | Petrasch | A01F 29/10 |
| | | | 241/101.742 |
| 5,092,110 A | 3/1992 | Dommert et al. | |
| 5,622,034 A | 4/1997 | Dommert | |
| 5,822,962 A * | 10/1998 | Wagstaff | A01D 43/10 |
| | | | 56/16.4 R |
| 6,062,009 A | 5/2000 | Caillouet | |
| 6,131,837 A * | 10/2000 | Wanner | A01D 43/086 |
| | | | 241/101.742 |
| 8,230,669 B2 * | 7/2012 | Hinds | A01D 45/10 |
| | | | 56/53 |
| 10,251,342 B2 * | 4/2019 | Bertino | A01F 29/10 |
| 2014/0325950 A1 * | 11/2014 | Verhoye | A01F 29/12 |
| | | | 56/71 |

FOREIGN PATENT DOCUMENTS

| | | |
|---|---|---|
| BR | PI 7707999 | 5/1978 |
| BR | PI 7705738 | 6/1978 |
| BR | PI 8703604 | 1/1989 |
| BR | PI 8902829 | 11/1990 |
| BR | MU 7101347 | 2/1993 |
| BR | MU 8001923 | 4/2002 |
| BR | MU 8300417-3 | 8/2003 |
| BR | PI 0600534-9 | 10/2007 |
| BR | PI 0601956-0 | 1/2008 |
| BR | MU 8901801-0 | 4/2011 |
| BR | MU 9002255-6 | 1/2012 |
| BR | PI 1002475-1 | 5/2012 |
| BR | 202014023751-3 | 6/2015 |
| BR | 102014011258-8 | 12/2015 |
| BR | 222015007941-7 | 6/2016 |

* cited by examiner

A-A

A-A

B-B

C-C

D-D

Det. E

Det. F

G-G

A-A

A-A

B-B

CHOPPING MODULE

FIELD OF THE INVENTION

The present invention relates to a module for chopping plants from different crops. The module is an improvement over an independent device driven by hydraulic motors. Consequently, the module has all the features necessary for mounting in various harvesters, including combine harvesters with the ability to cut, harvest, and chop various crops or a single specific crop which, for any reason, should be chopped soon after harvesting, for example, sugar cane, wherein the harvested material is cut into billets. The improvement relates to a module having a cylinder-shaped rotating set with various lengthwise knives located at its external diameter, acting jointly with a counter knife, forming a modular cutting unit used to chop plants from different cultures, such as: cotton, sorghum, forage sorghum, sugar cane, cane for energy, cane for forage and others.

BACKGROUND OF THE INVENTION

The present application is based on a prior cutting module as described below that was defined by a cylinder with various lengthwise cutting knifes, wherein each one of them has the cutting wire extended throughout the length of the cylinder, and thus, each knife also passes throughout the length of the counter knife, wherein the cut is performed by shearing and, at the same time, by the penetration of the cutting wire of each knife. Performed assays have shown that this module could be improved so to reduce cutting "forces" and also reduce the impact between each cutting knife and the counter knife.

There are currently a wide variety of devices used to cut or chop different plants. Some of these devices are independent machines, while others are integrated into different harvesters, as taught, for example, by the following documents: BR202014023751, BR222015007941, BR102014011258, BRMU7101347, BRMU8001923, BRMU8300417, BRMU8901801, BRMU9002255, BRPI0600534, BRPI0601956, BRPI1002475, BRPI7605903, BRPI7606656, BRPI7705738 BRPI7707999 BRPI8703604 BRPI8902829, U.S. Pat. Nos. 3,141,281, 3,482,690, 3,599,404, 3,673,774, 3,788,048, 3,830,046, 3,848,399, 3,958,397, 4,019,308, 4,065,912, 4,121,778, 4,295,325, 5,092,110, 5,622,034 and 106,062,009.

All these documents provide a continuous form of cutting, i.e. on one side, a plant is pulled inside the device and, subsequently, a rotating blade assembly cuts the plant into segments which are thrown outside, on the opposite side of the inlet of the device.

Objects of the Invention

The first object of the invention is to provide an improved module which has advantages over the prior module as described herein. In the improved module of the present invention, the inventors keep the counter knife as in the prior module, but the cutting knives are located in lengthwise lagged segments, i.e. each cutting knife is defined by at least two lengthwise segments, lagged to each other, so that, while cutting (during rotation), each knife segment reaches a counter knife extension and the following extension is only reached by the following segment after the first one has already made the cut, and so on. With this embodiment, the set allows for considerable reduction of the cutting forces or pressure, and consequently allows for smooth operation and considerably increases the working life of the set. The present invention also provides a chopping module which can be easily mounted onto a harvester and which provides advantages not found in conventional harvesters.

BRIEF DESCRIPTION OF THE DRAWINGS

For better understanding of the present invention, its detailed description follows, with reference to the attached drawings wherein.

DETAILED DESCRIPTION OF THE INVENTION

Figure 1:
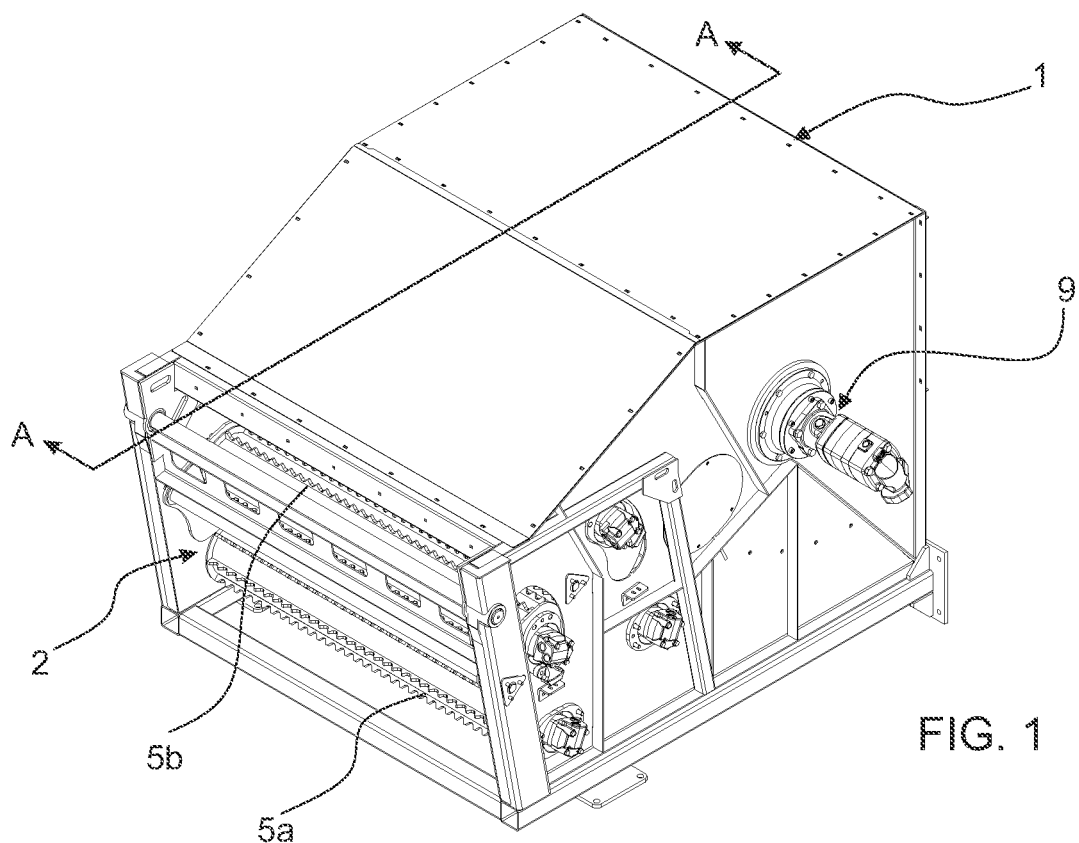
FIG. 1 shows an assembled form of the prior module as described herein from a front upper angle perspective view.
Figure 2:
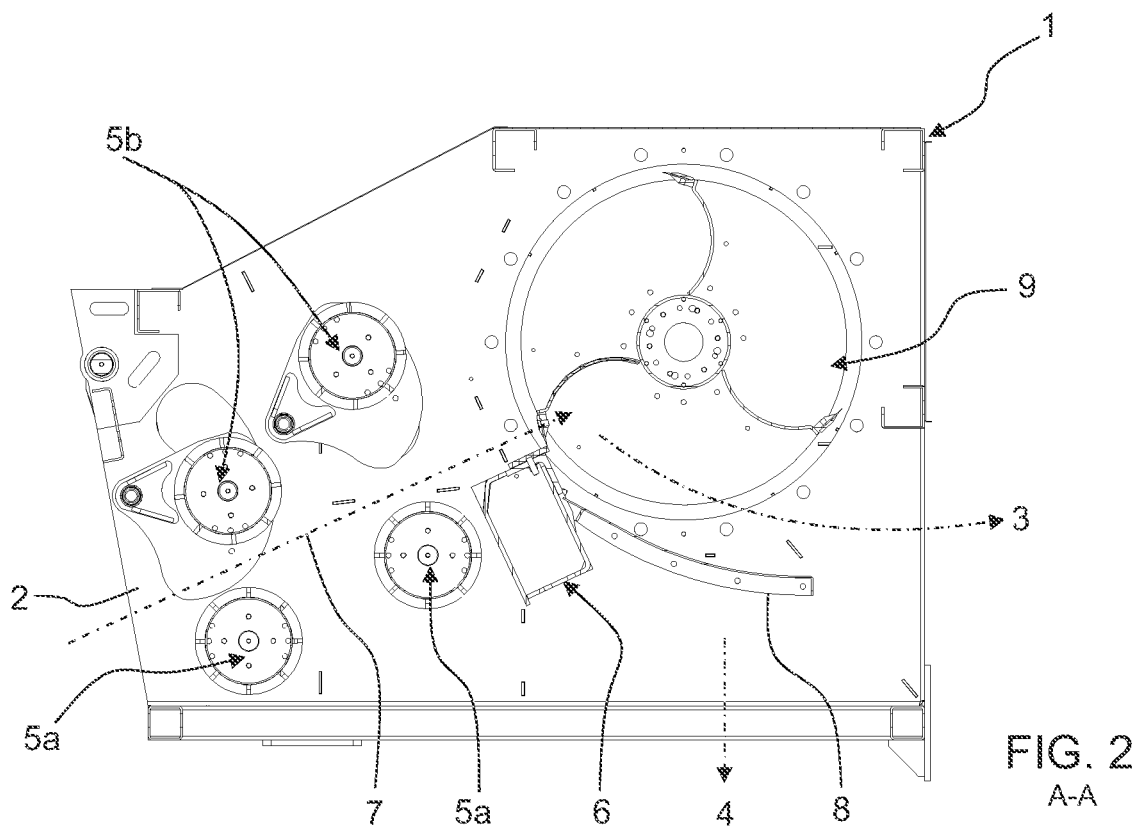
FIG. 2 shows a view of the lengthwise cut "A-A" as indicated by FIG. 1.
Figure 3:
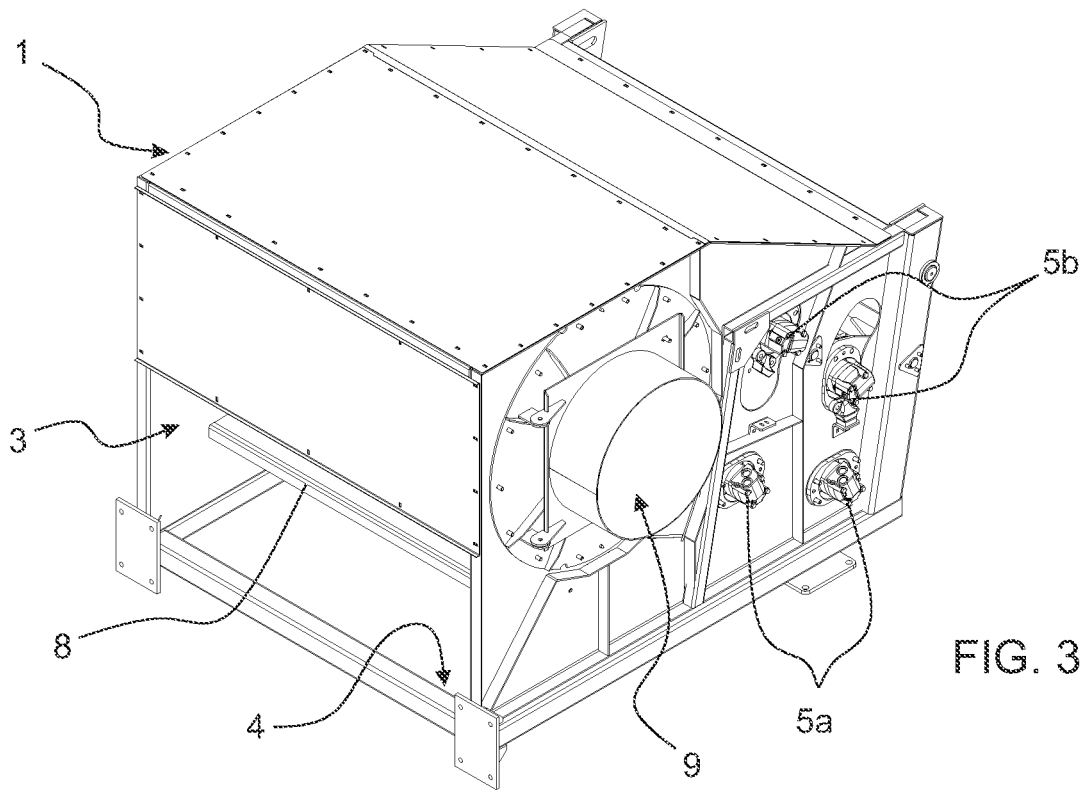
FIG. 3 shows the prior module from a rear upper angle isometric view.
Figure 4:
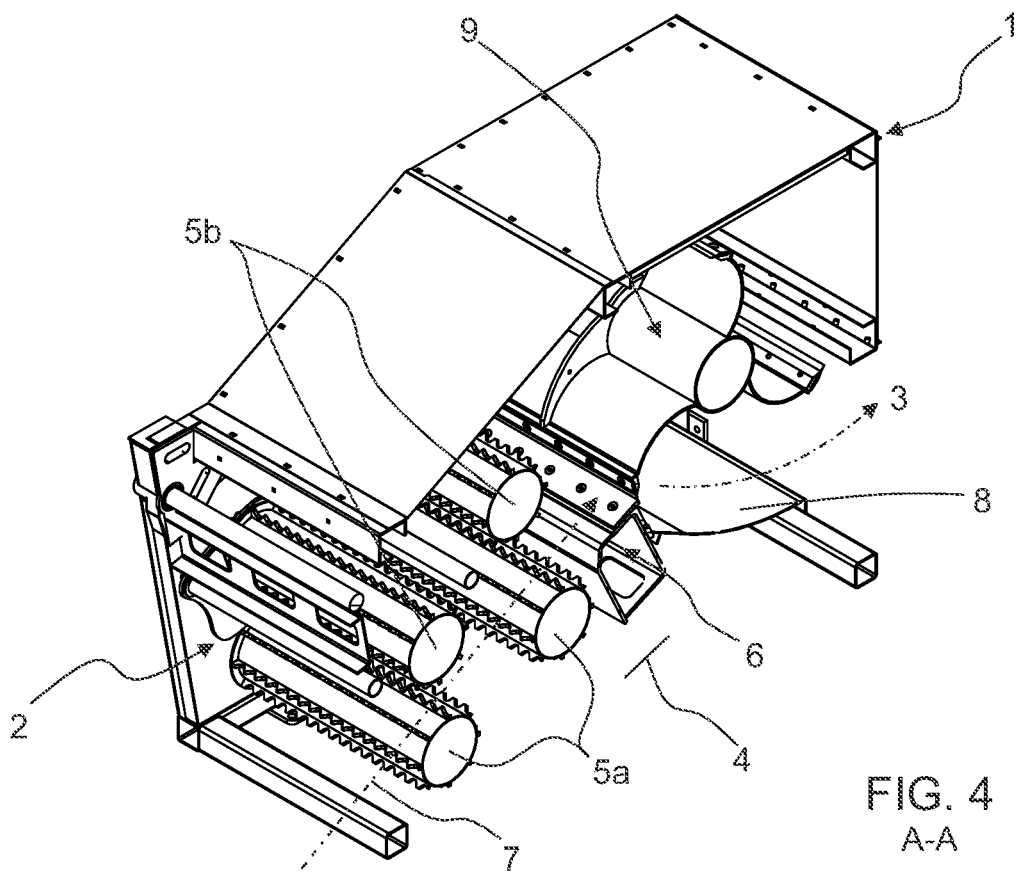
FIG. 4 is an isometric view of the "A-A" cut.
Figure 5:
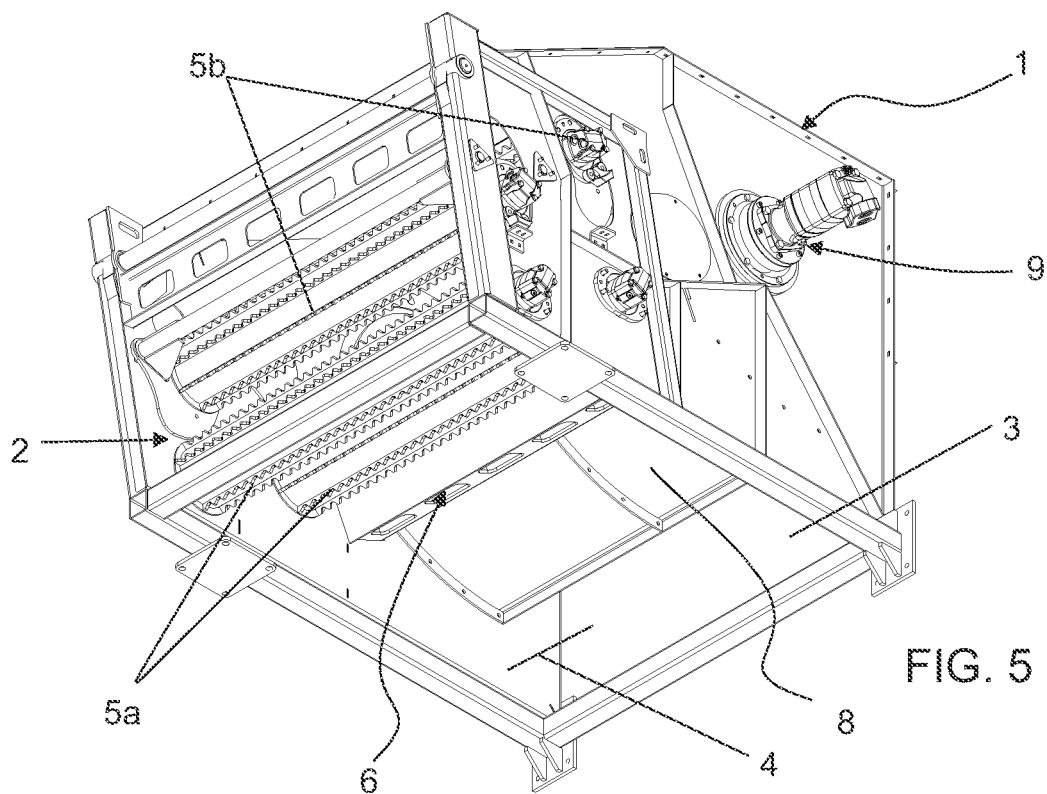
FIG. 5 shows the prior module from a front lower angle isometric view.
Figure 6:
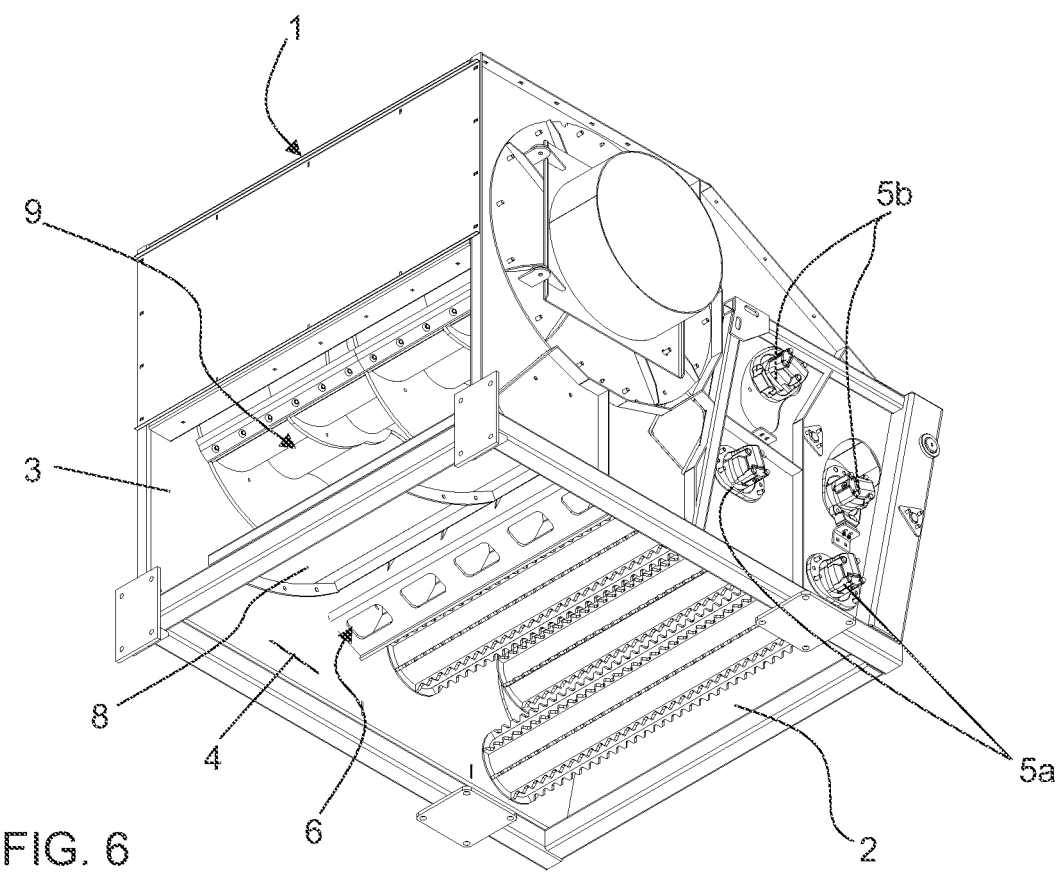
FIG. 6 shows the prior module from a rear lower angle isometric view.

In a prior embodiment of the module of the present invention, which is illustrated in the drawing figures and the details below, more particularly FIGS. 1 to 6, a prior art chopping module is shown which is improved upon herein by virtue of the present invention of the improved chopping module as described further below. The prior module comprised a parallelepiped box-shaped body (1), with three open sides, the first one configuring a front inlet (2) for the plant to be chopped, the second one configuring a rear outlet (3) for the chopped plant, and the third one configuring a lower outlet (4) for residues.

Adjacent to the front inlet (2), there are two crosswise pairs of rotating rollers for pulling the plants to be chopped, a lower pair of stationary rollers (5a) and an upper pair of floating rollers (5b).

Adjacent to the lower pair of stationary rollers (5a) and the upper pair of floating rollers (5b), a fixed shearbar (6) is mounted crosswise, aligned parallel to the lower pair of stationary rollers (5a), wherein, a passageway (7) for the plants to be chopped is formed between the lower pair of stationary rollers (5a) and the upper pair of floating rollers (5b). After the fixed shearbar (6), the passageway (7) has an extension in the form of a slide (8) sloping downwards to the rear outlet (3) for the chopped plants; and a crosswise rotating blade assembly (9), located above the slide (8) adjacent to the fixed shearbar (6).

Figure 7:
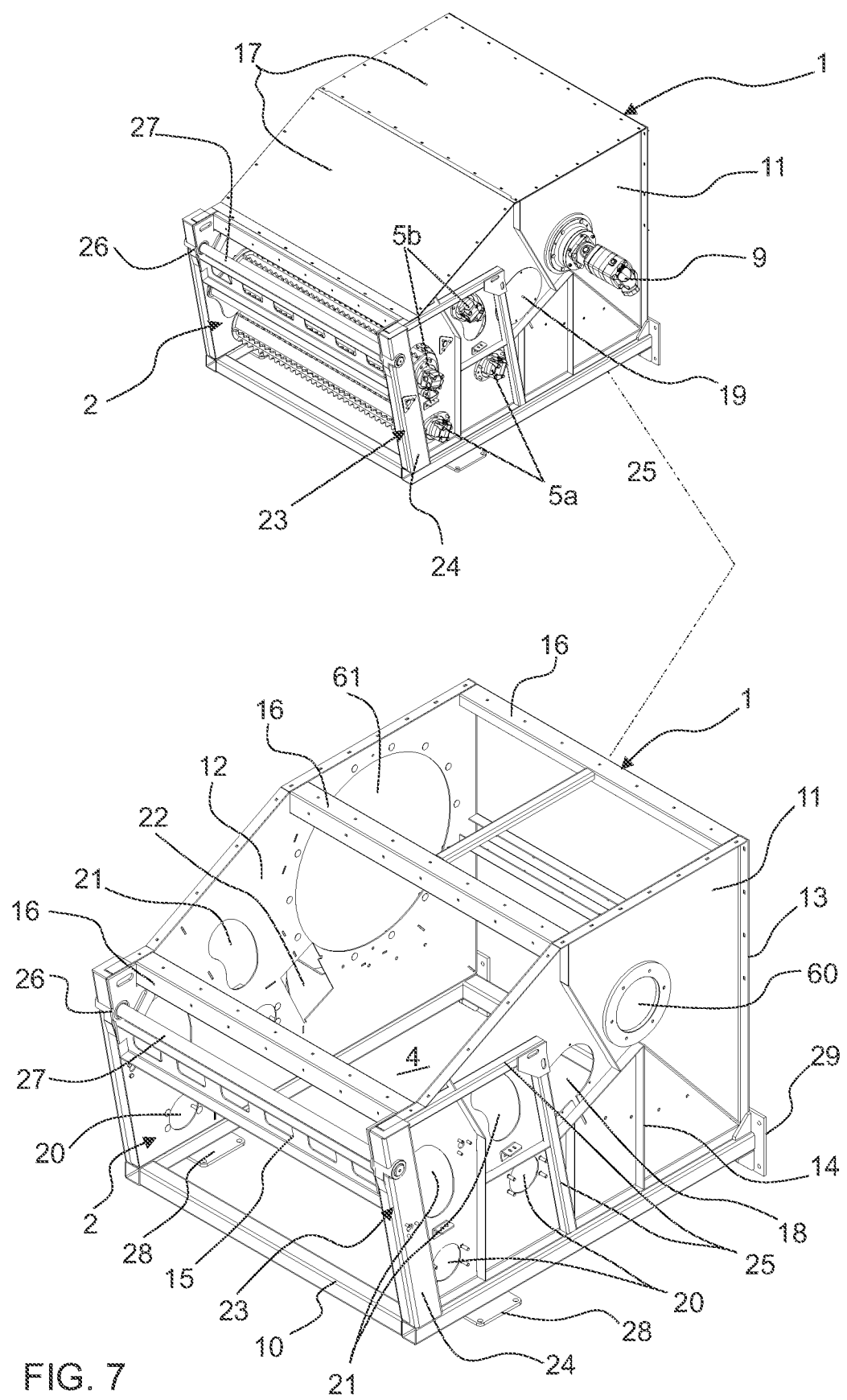
FIG. 7 shows two perspective views, one reference view and one structural view of the prior module from a front upper angle.
Figure 8:
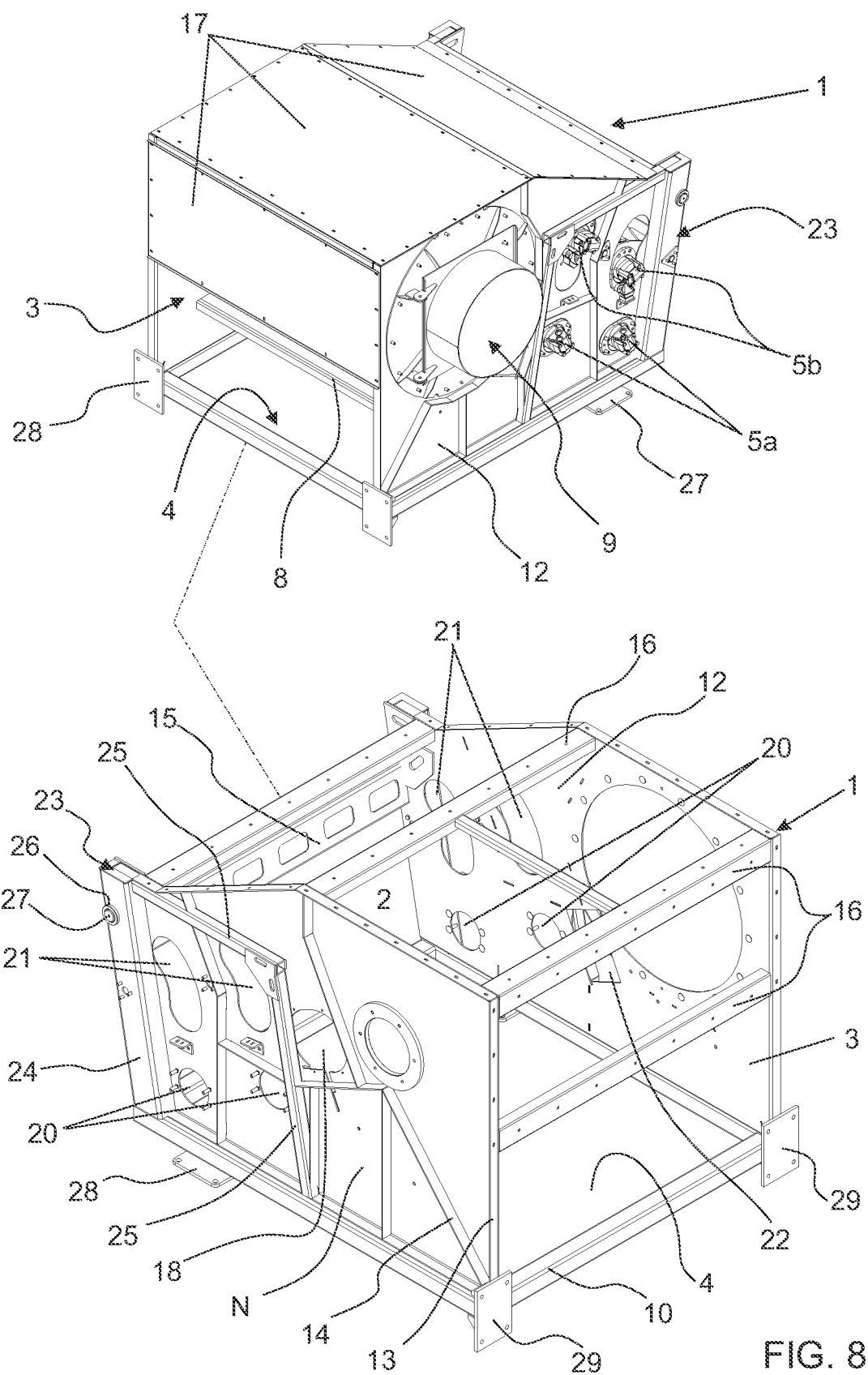
FIG. 8 also shows two perspective views, one reference view and one structural view of the prior module from a rear upper angle.
Figure 9:
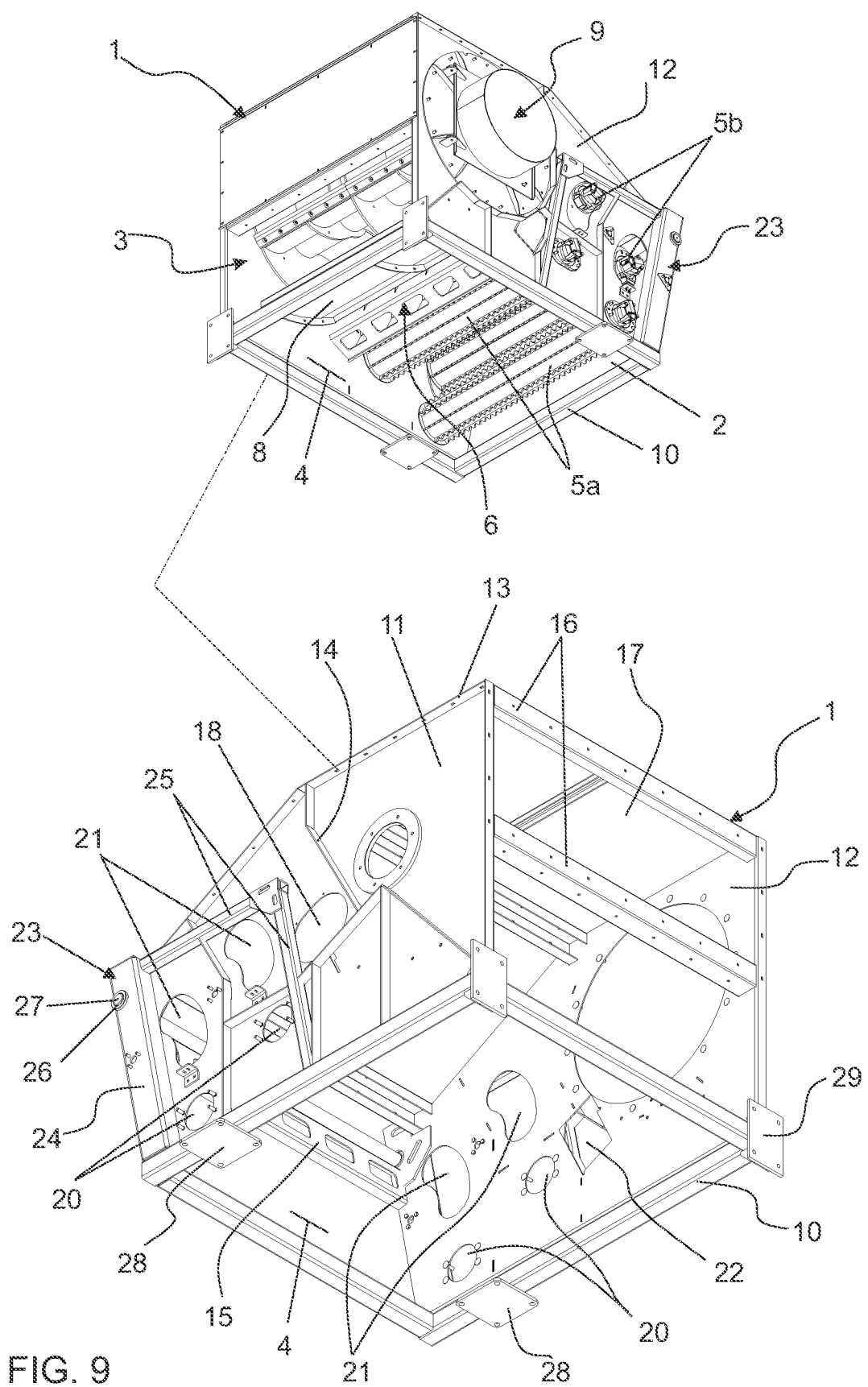
FIG. 9 shows two perspective views, one reference view and one structural view of the module from a rear lower angle.

FIGS. 7, 8 and 9 show in detail the parallelepiped box-shaped body (1), showing that it comprises a metal tube base forming a frame (10) which outlines the lower outlet (4) for residues and forms a support for a first side panel (11) and a second side panel (12), both with contouring flaps (13) and reinforcement ribs (14) on the outside. On the inside, the side panels (11) and (12) are interconnected by a front metal crossbeam (15), and upper and rear metal crossbeams (16), wherein the front metal crossbeam (15), the frame (10), and the side panels (11) and (12) limit the front inlet (2) for harvested plants to be chopped. The upper metal crossbeam (16) is placed over the upper portion and the rear metal crossbeam (16) is placed on the rear portion, the latter limiting the rear outlet (3). The upper and rear metal crossbeams (16) receive cover panels (17). On the upper portion, the cover panels (17) define two planes, a horizontal and a sloped plane, wherein, on that portion, side panels (11) and (12) have an ordinary trapezoid configuration.

The first side panel (11) includes a first opening (18) with a cover (19), aligned with a rectangular opening (22) on the second side panel (12). The first side panel (11) also includes circular openings (20), and oblong openings (21) aligned to respective circular openings (20) and oblong openings (21) equally positioned on the second side panel (12). The circular openings (20) constituting fixing points for the respective edges of the lower pair of stationary rollers (5a), the oblong openings (21) constituting fixing points for the respective edges of the upper pair of floating rollers (5b), and the first opening (18) and the rectangular opening (22) constituting fixing points of the fixed shearbar (6).

The box-shaped body (1) also includes a complementary structure (23) located at a front portion. The complementary structure (23) is formed by a frame on each side, each one formed by a vertical tube (24) on the outside of the box-shaped body (1), next to the front edge of the respective side panels (11) and (12), the vertical tubes (24) interlinked to horizontal tubes in a square (25). The vertical tubes (24) also constitute reinforcements for positioning bushings (26) with rotating support for the edges of a round bar (27) located above the front metal crossbeam (15). The round bar (27) constitutes a point for coupling the module to the respective parts of a harvester. The frame (10) also distributes lower plate portions (28) and rear plate portions (29) forming additional fixing points.

Figure 10:
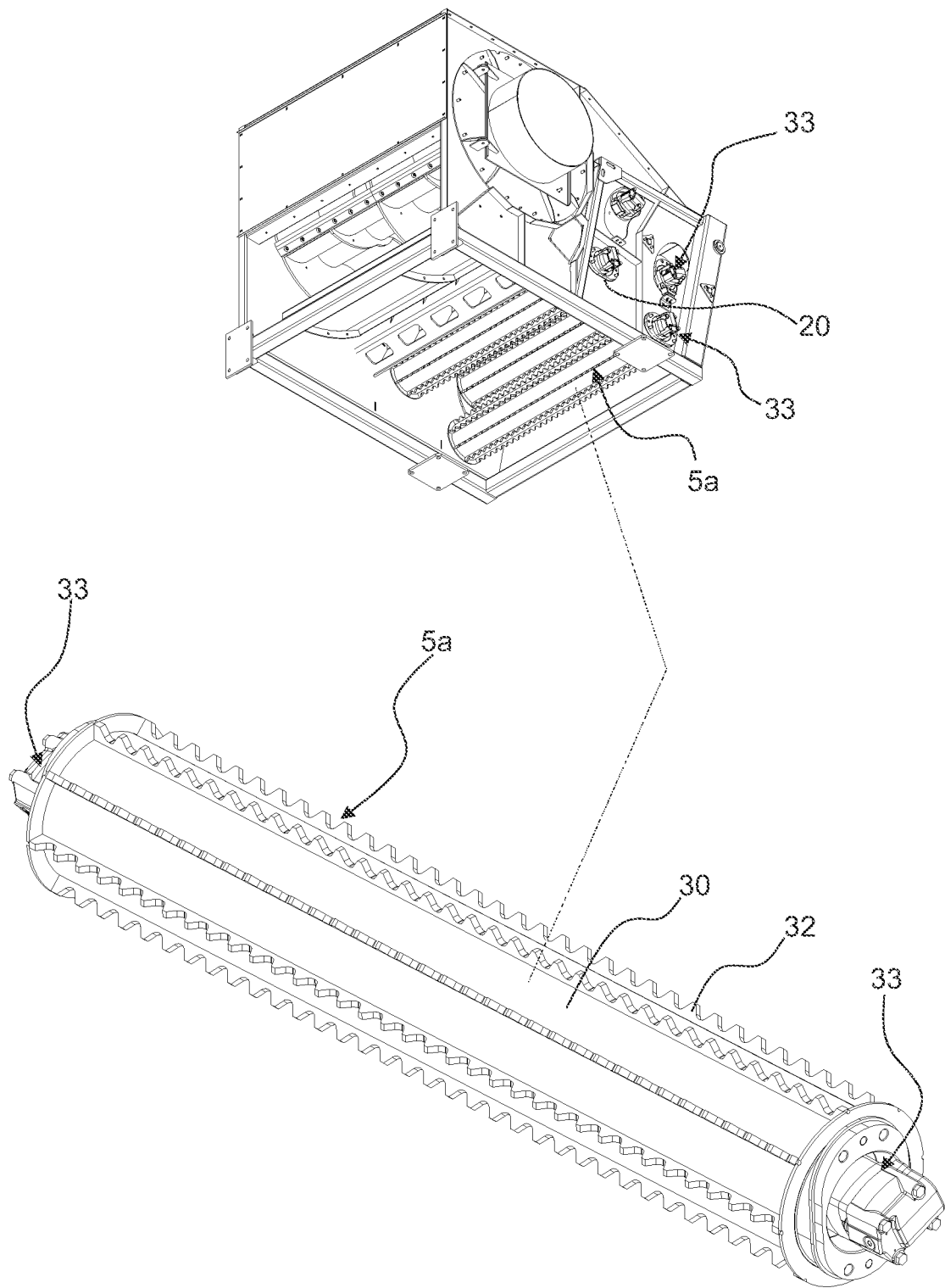
FIG. 10 shows a reference perspective view and a perspective view of one of the stationary rollers which pull the plant to be chopped.
Figure 11:
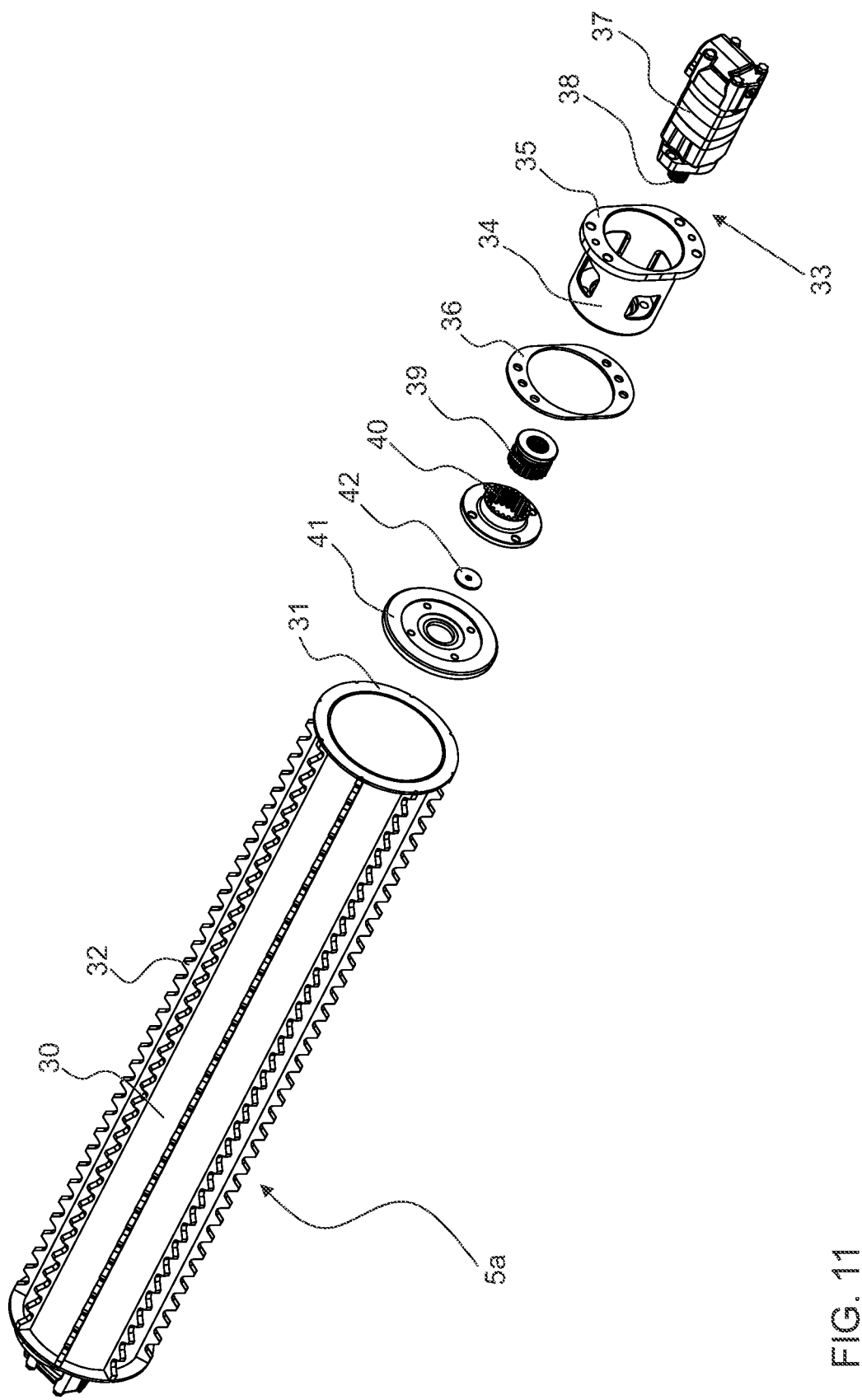
FIG. 11 shows a detailed, exploded, perspective view of the stationary rollers which pull the plant to be chopped.
Figure 12:
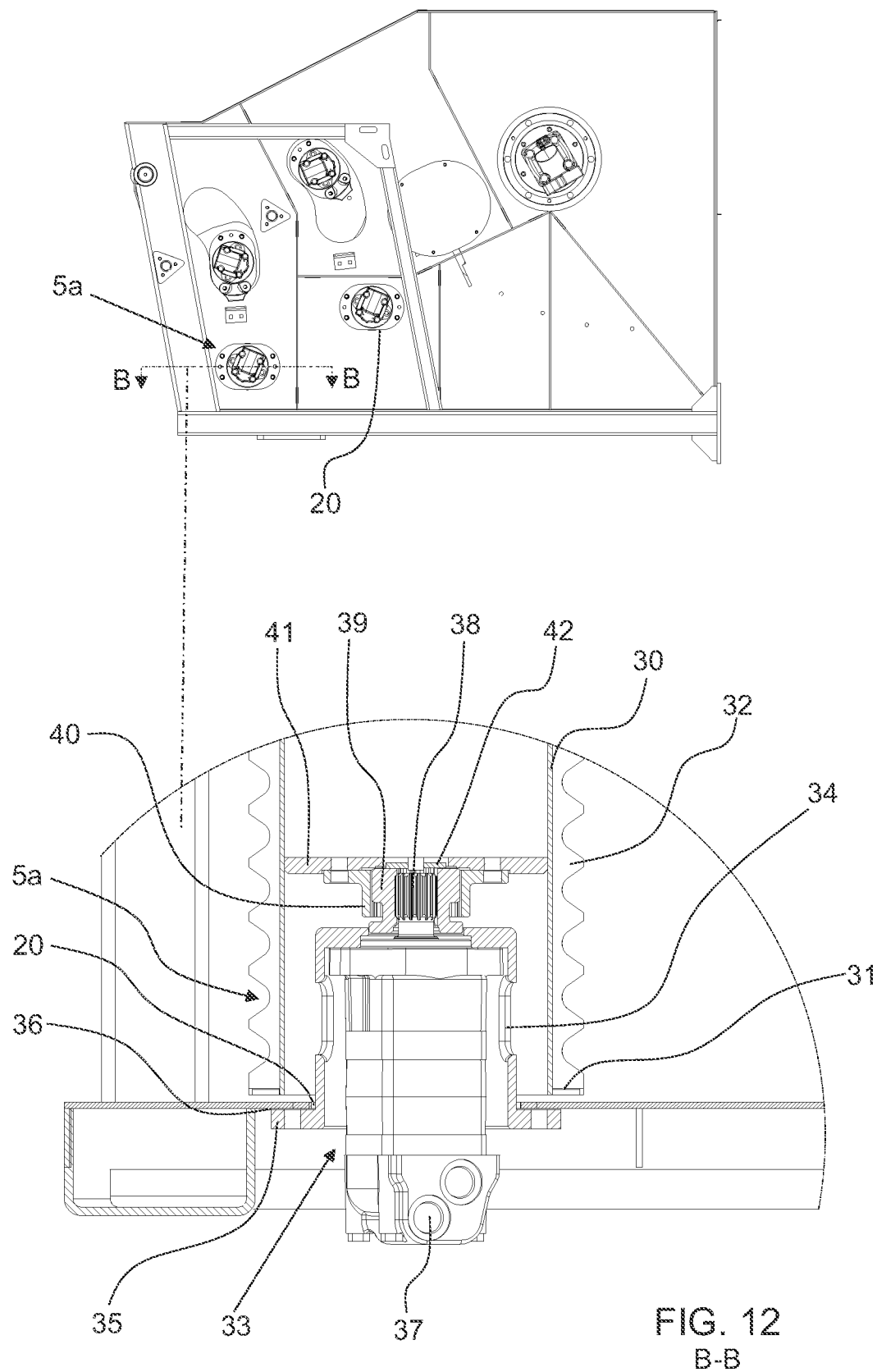
FIG. 12 shows an upper side view and a detailed, magnified cut view, highlighting the assembly of one of the stationary rollers which pull the plant to be chopped.

FIGS. 10, 11 and 12 show in detail one of the lower pair of stationary rollers (5a), which is formed by a tube (30) which, includes internal flanges (31) at its edges, and radially distributes jaws in the form of toothed bands (32) along its circumference. The two edges of each of the lower pair of stationary rollers (5a) are equally coupled to identical hydraulic actuators (33), each one formed by a cylindrical hub (34), fittable to the respective circular openings (20), wherein they are fixed by its flanges (35) and respective reinforcements (36). Inside the cylindrical hub (34), a hydraulic motor (37) is embedded and fixed. The hydraulic motor (37) has its driven shaft (38) turned inwards and crossing the bottom of the cylindrical hub (34), after which it receives a bound bushing (39). The bound bushing (39) engages with a flanged bushing (40) fixed to a roller disc (41) which, includes an abutment ring (42), and is also fixed to the internal diameter of the tube (30) at an appropriate depth for the respective portion of the cylindrical hub (34) to be embedded inside the tube (30). Therefore, we can observe that hydraulic actuators (33) at both ends of the lower pair of stationary rollers (5a) allows the lower pair of stationary rollers (5a) to be turned firmly and ensures equal pulling forces along the lengths of the lower pair of stationary rollers (5a), thus avoiding fatigue at their edges and consequently also enhancing the operation of the toothed bands (32).

Figure 13:
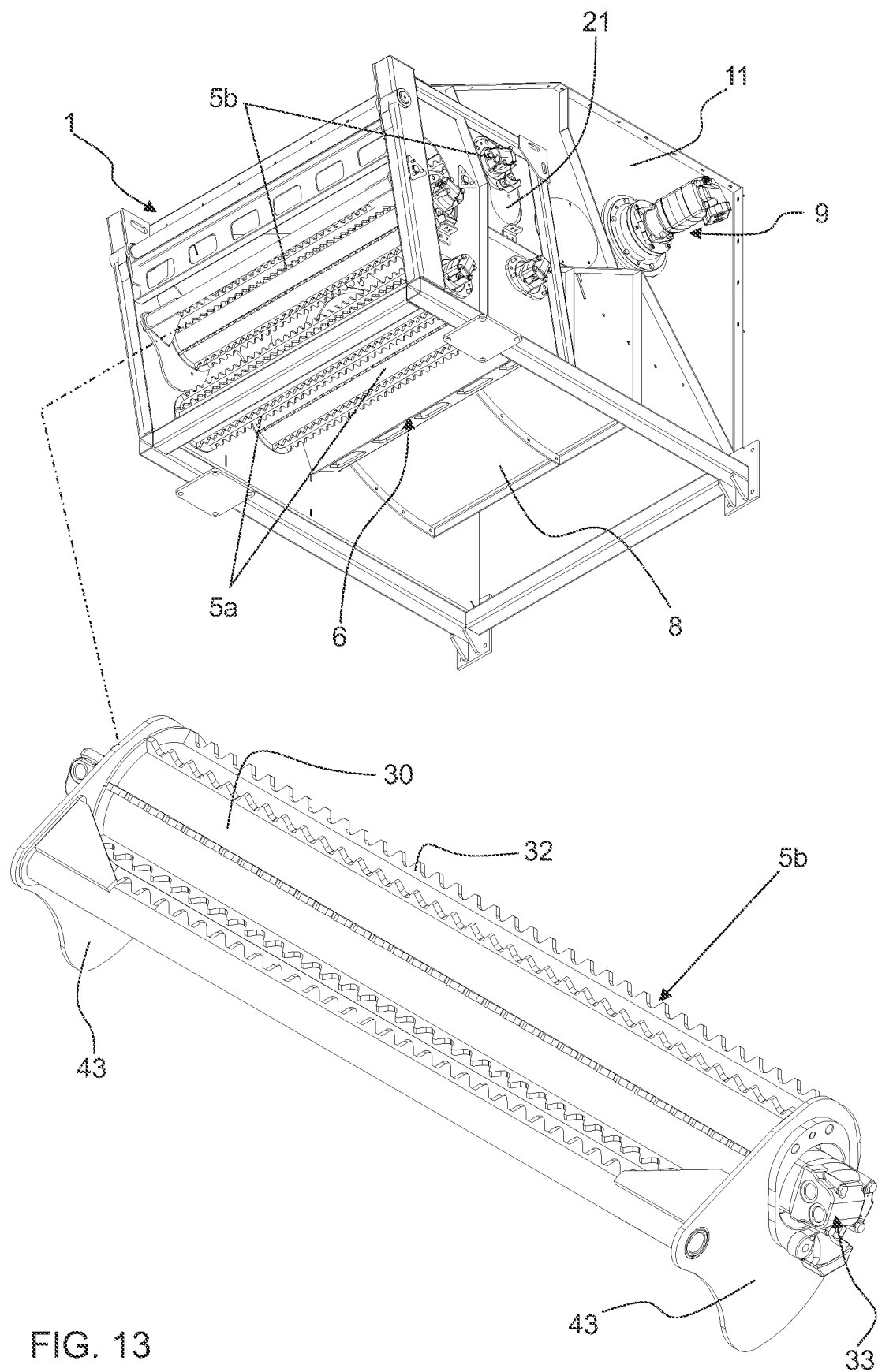
FIG. 13 shows a reference perspective view and a perspective view of one of the floating rollers which pull the plant to be chopped.
Figure 14:
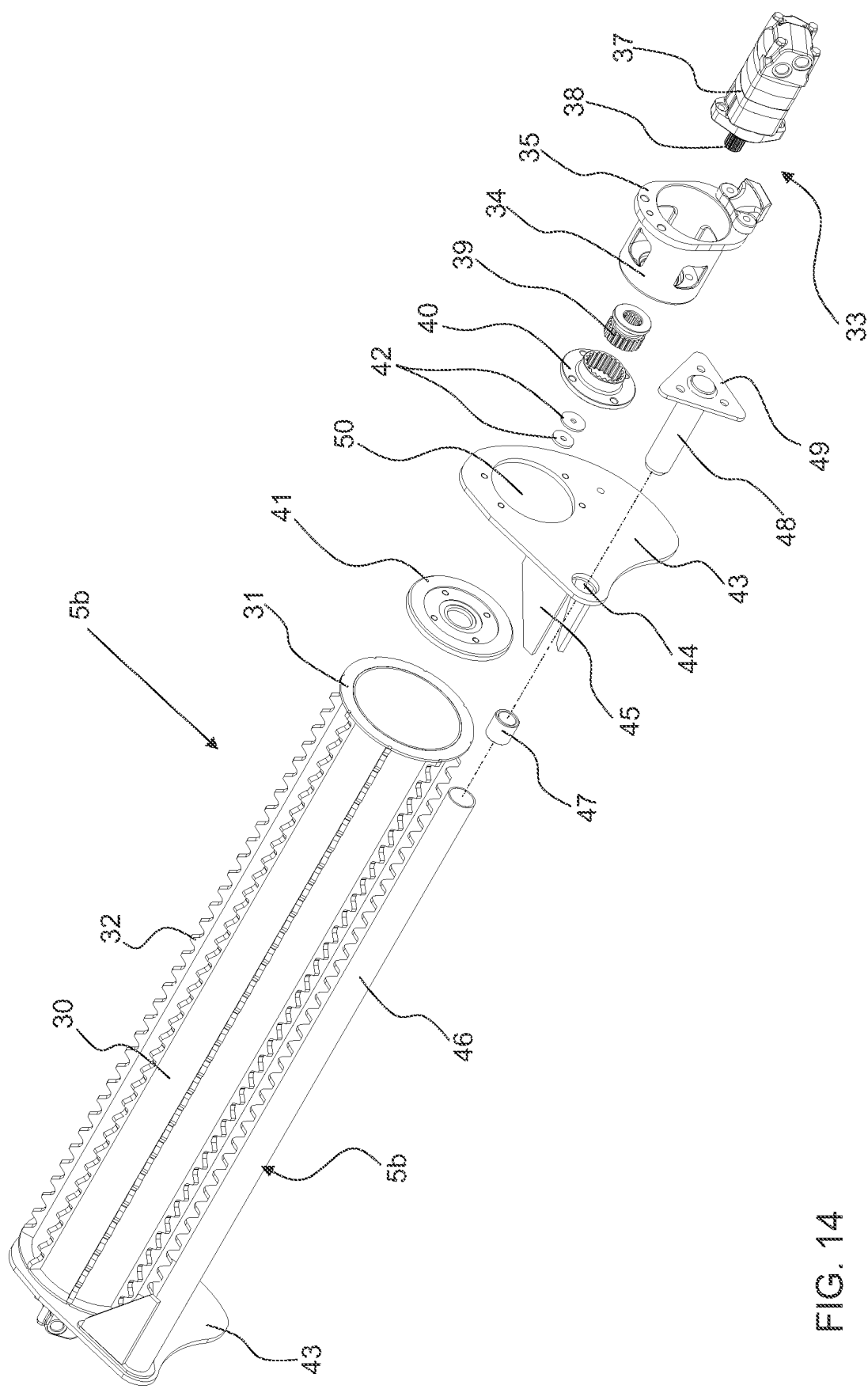
FIG. 14 shows a detailed exploded perspective view of the floating rollers which pull the plant to be chopped.
Figure 15:
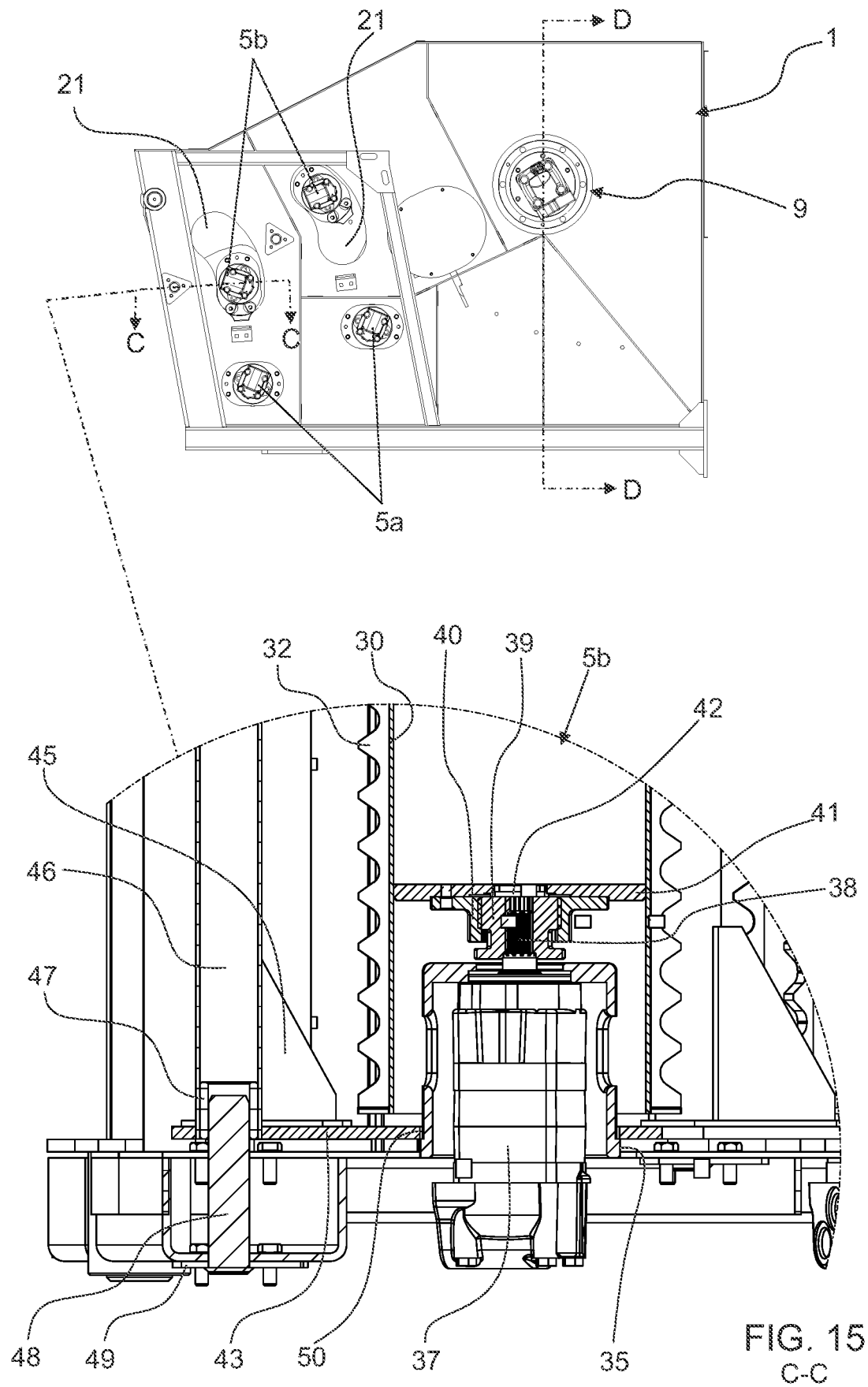
FIG. 15 shows an upper side view and a detailed magnified cut view, highlighting the assembly of one of the floating rollers which pull the plant to be chopped.

FIGS. 13, 14 and 15 show in detail one of the upper pair of floating rollers (5b), which are similar to the lower pair of stationary rollers (5a), except for the means of fixing their edges, which is performed in a floating way in the oblong openings (21). The means of fixing the upper pair of floating rollers (5b) thus comprising, at each edge, a drop-shaped arm plate (43) having a more acute side with a first drop-shaped arm plate hole (44) positioned between roller reinforcements (45). The respective edge of a fixed tube (46) and respective internal bushings (47) are fixed between the roller reinforcements (45), the latter ones having rotatory engagement for the edges of end pins (48). The opposed edges of end pins (48) have fixing plates (49) fixed to the respective side panels (11) and (12). Said plate arms (43) are close to the internal part of said side panel (11) and (12), wherein said plate arms (43) have a second drop-shaped arm plate hole (50) which, is aligned to the oblong openings (21), and receives the cylindrical hubs (34). The flanges (35) of the cylindrical hubs (34) are fixed to the drop-shaped plate arms (43). Consequently, the edges of each of the upper pair of floating rollers (5b) are free to move alongside the oblong openings (21), where they cross said cylindrical hubs (34).

With this prior embodiment, the height of the passageway (7) formed between the lower pair of stationary rollers (5a) and the upper pair of floating rollers (5b) is self-adjusted or automatically adjusted according to the volume of plants which is caught and pulled inside the machine. Obviously, said effect is provided by the floating assembly of the upper pair of floating rollers (5b).

Figure 16:
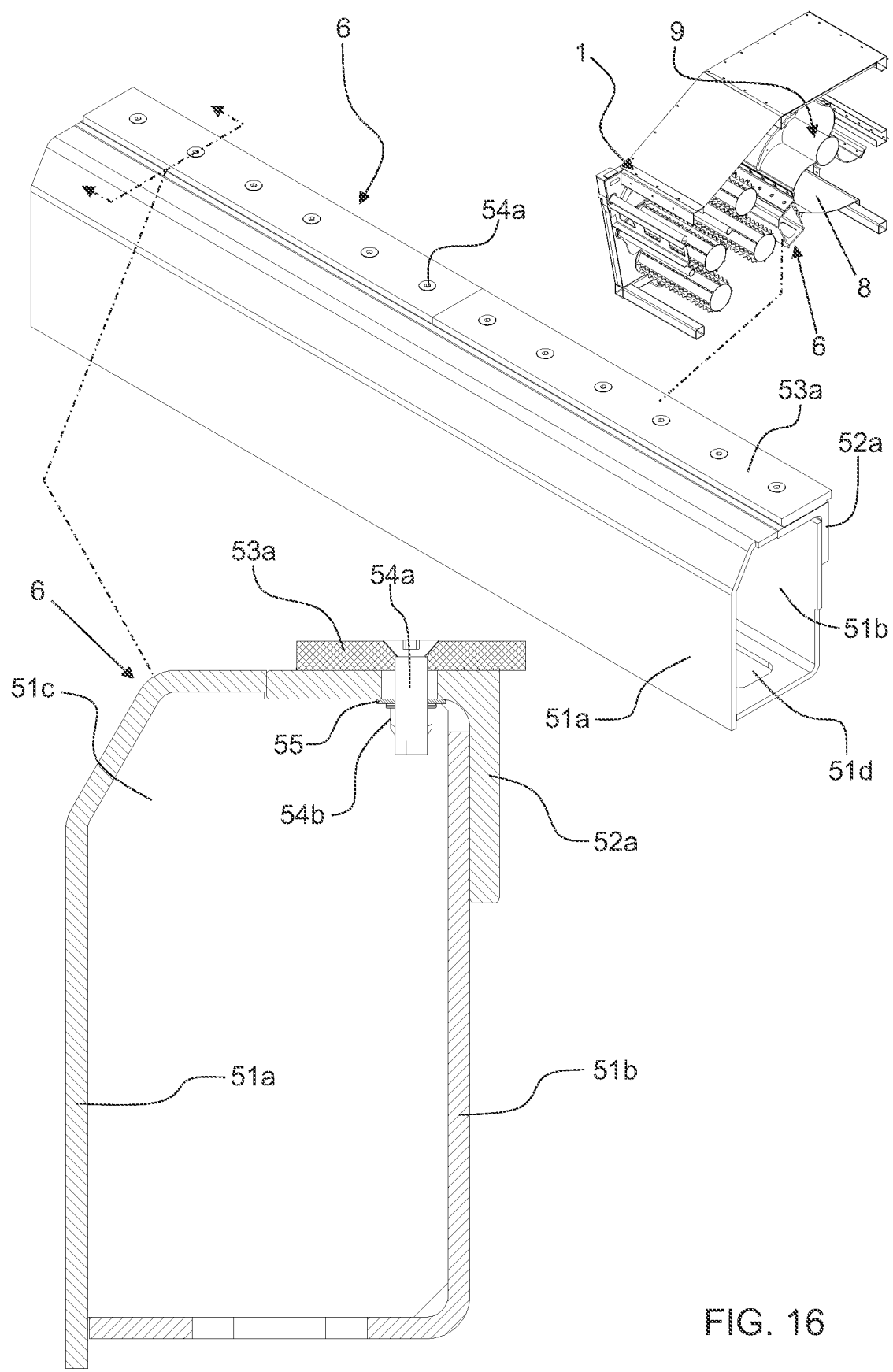
FIG. 16 shows three figures detailing the fixed blade set, an isometric reference cut view, a perspective view of only the assembled fixed shearbar, and a crosswise cut view of the fixed shearbar.
Figure 17:
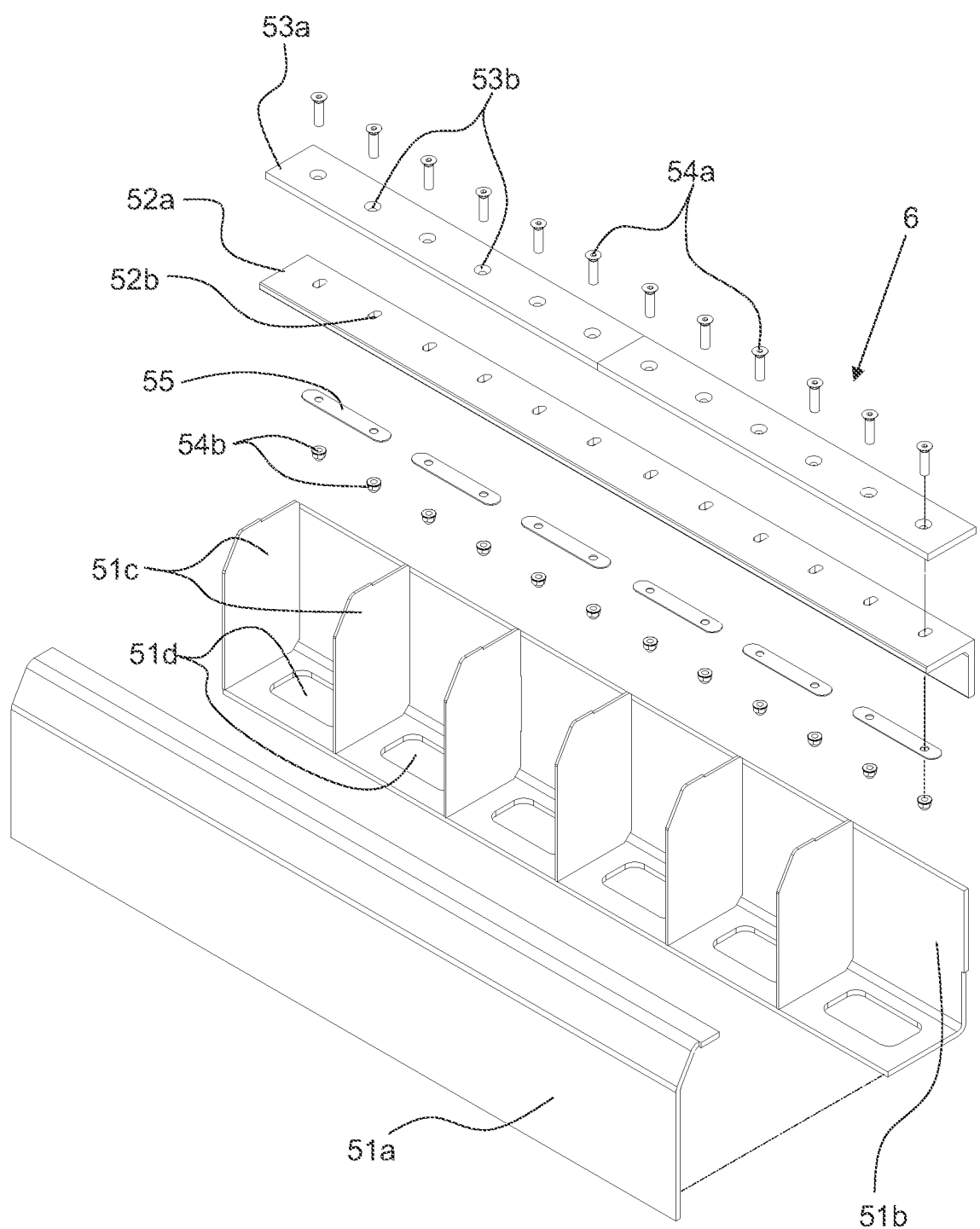
FIG. 17 shows a detailed exploded perspective view of each one of the components of the fixed shearbar.
Figure 18:
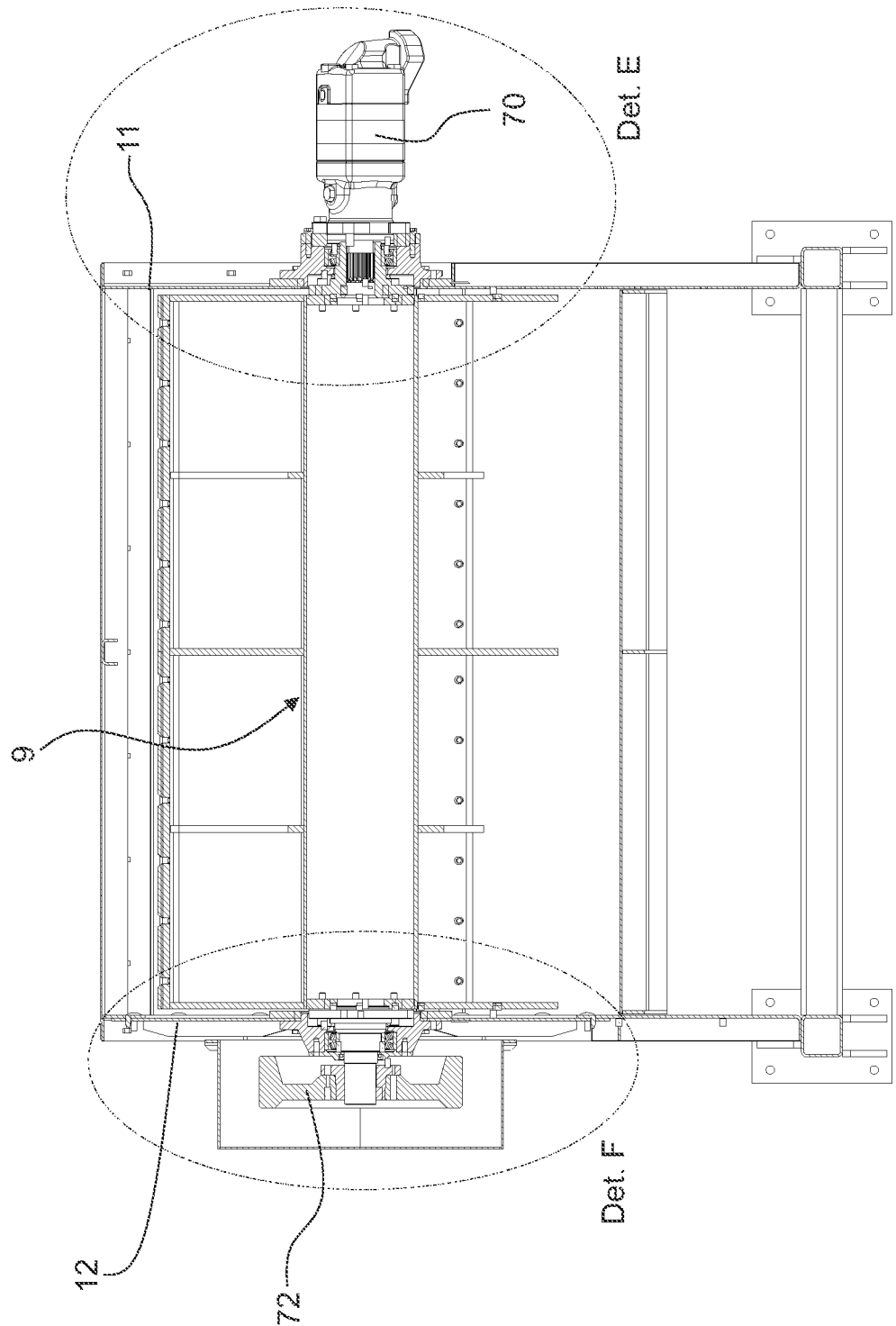
FIG. 18 shows a crosswise cut view "D-D" indicated in FIG. 15, showing details of the rotating blade assembly.
Figure 19:
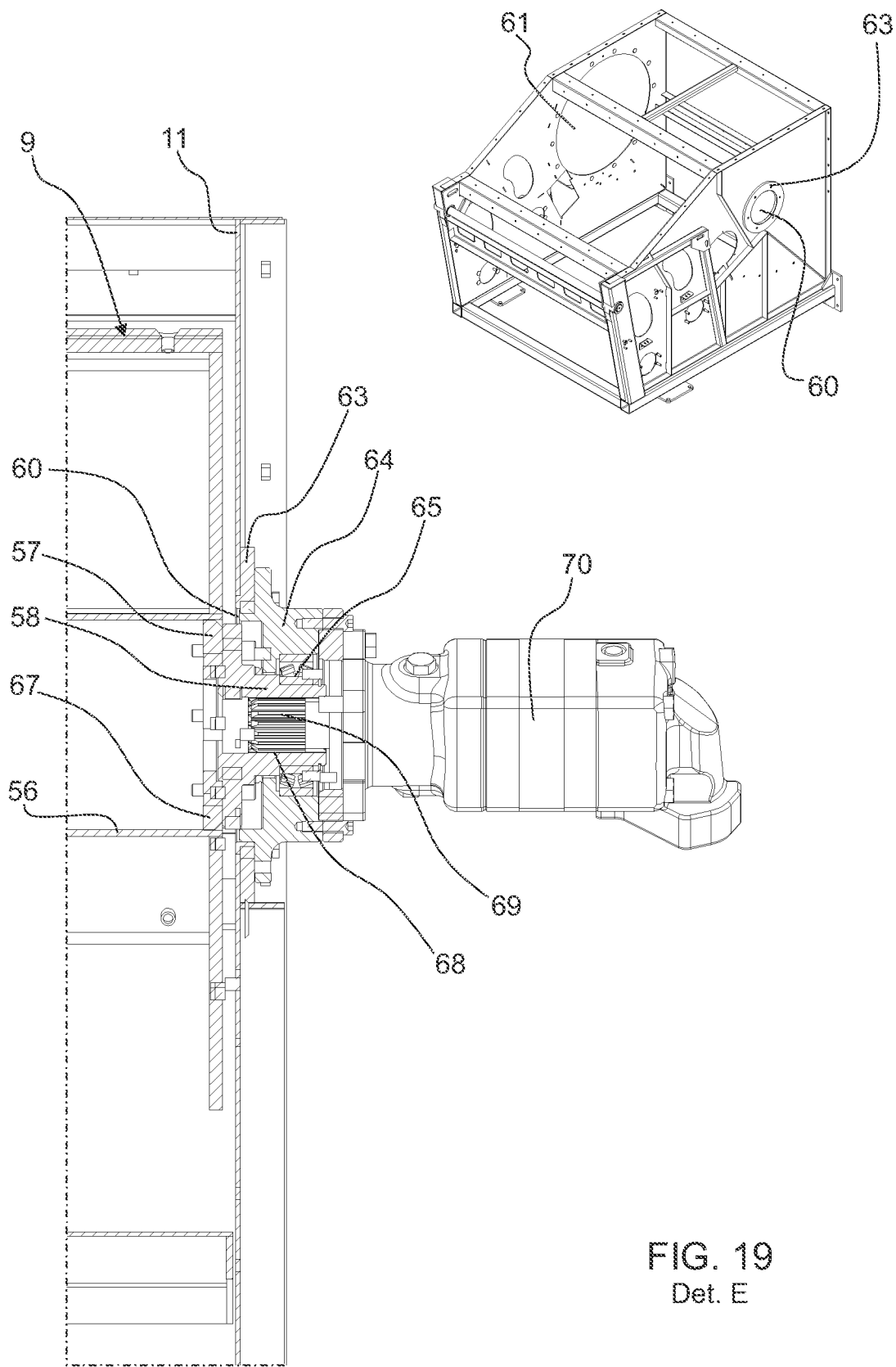
FIG. 19 shows a magnified view of "E" as indicated in FIG. 18, showing in detail the hydraulic actuators as assembled on one of the edges of the rotating blade assembly.
Figure 20:
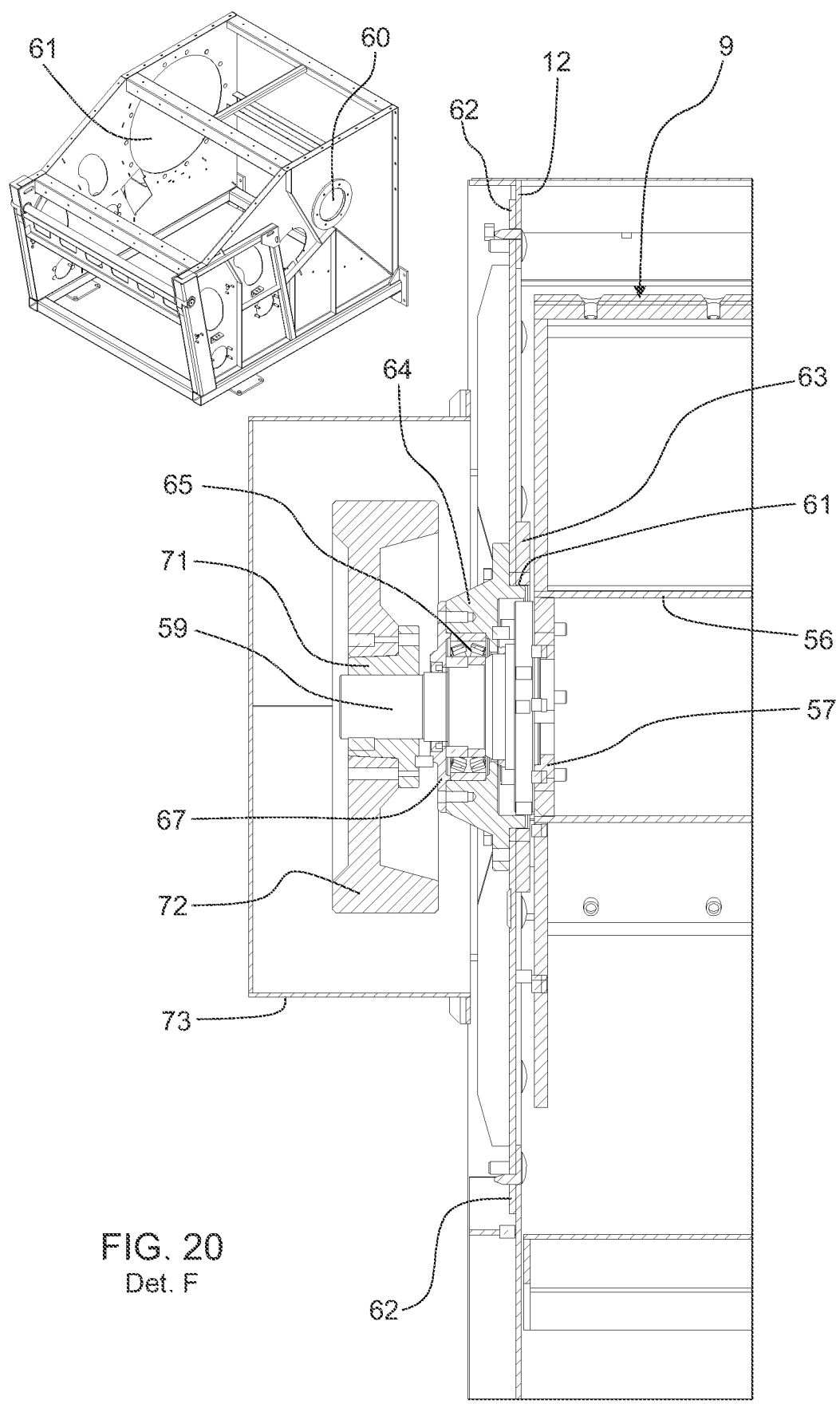
FIG. 20 shows a magnified view of "F" as indicated in FIG. 18, showing in detail the steering wheel/counterweight as assembled on one of the edges of the rotating blade assembly.
Figure 21:
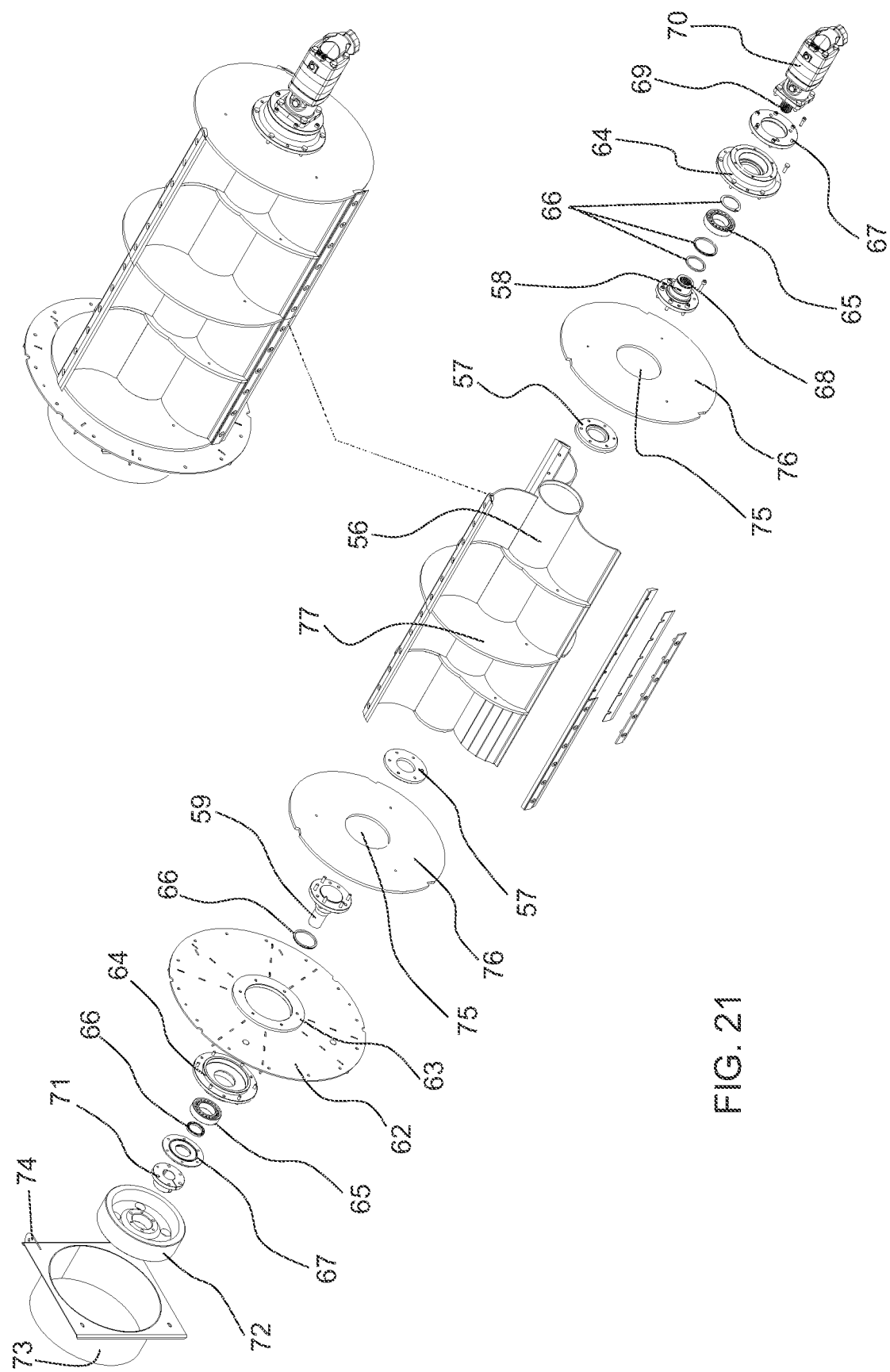
FIG. 21 shows a reference perspective view of the rotating blade assembly as assembled, and an exploded perspective view detailing each component of the device, both perspective views taken from the side of the hydraulic motor.
Figure 22:
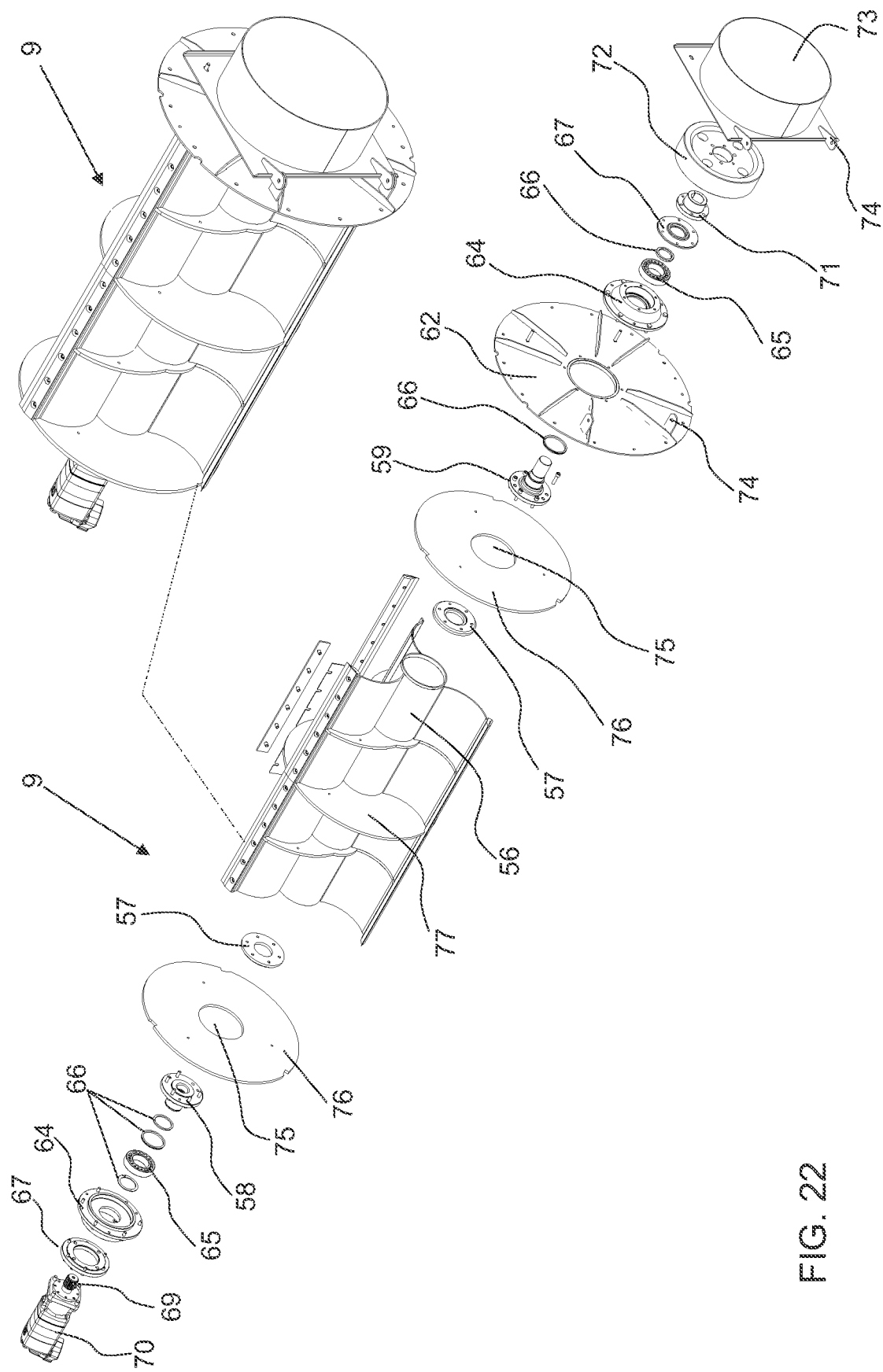
FIG. 22 shows two identical views to the previous ones, but from a different angle and on the side of the steering wheel/counterweight, showing other details of the rotating blade assembly.
Figure 23:
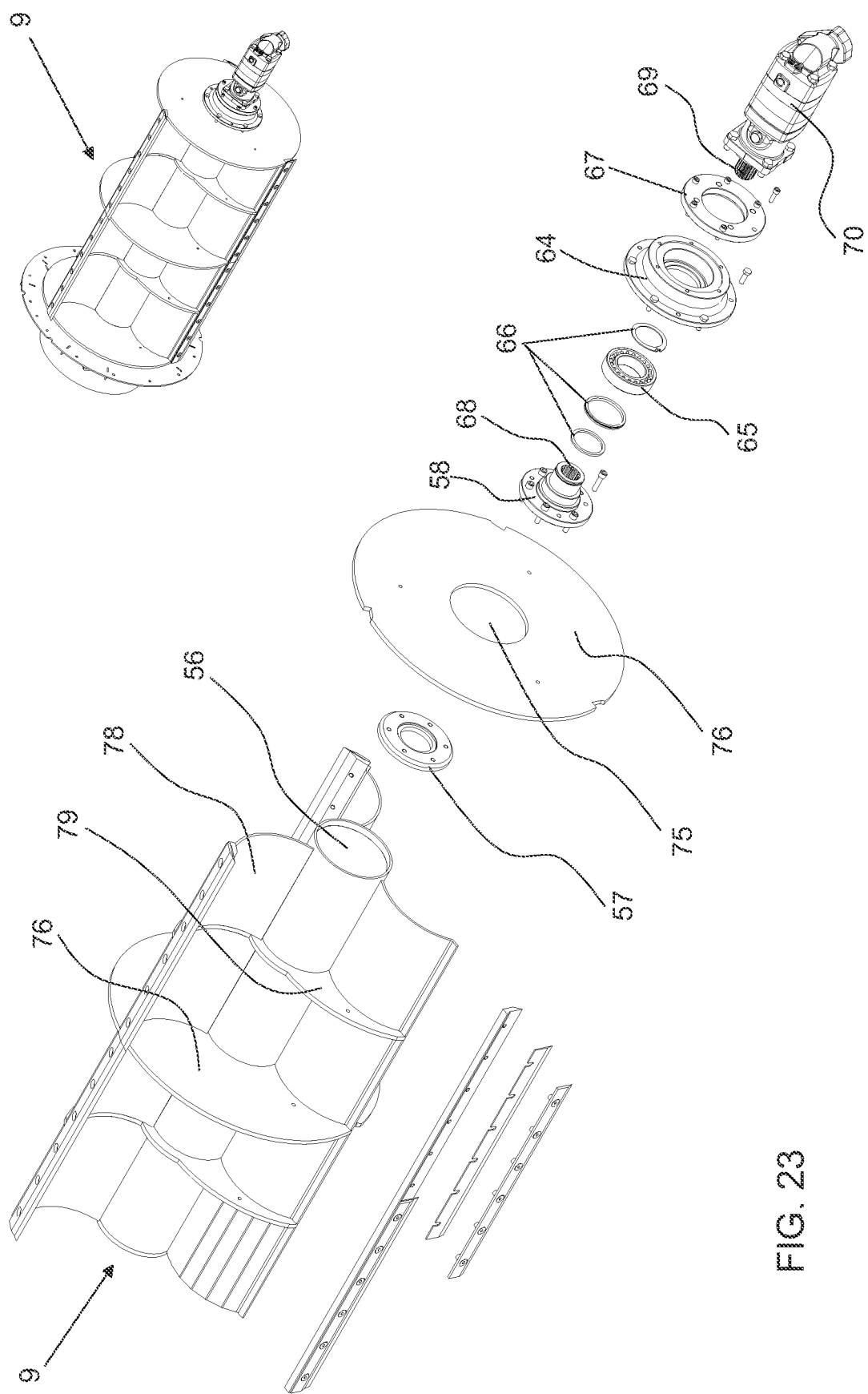
FIG. 23 is a reference perspective view, and a detailed magnified perspective view, as shown by FIG. 21, showing in further detail the side with hydraulic actuators of the rotating blade assembly.
Figure 24:
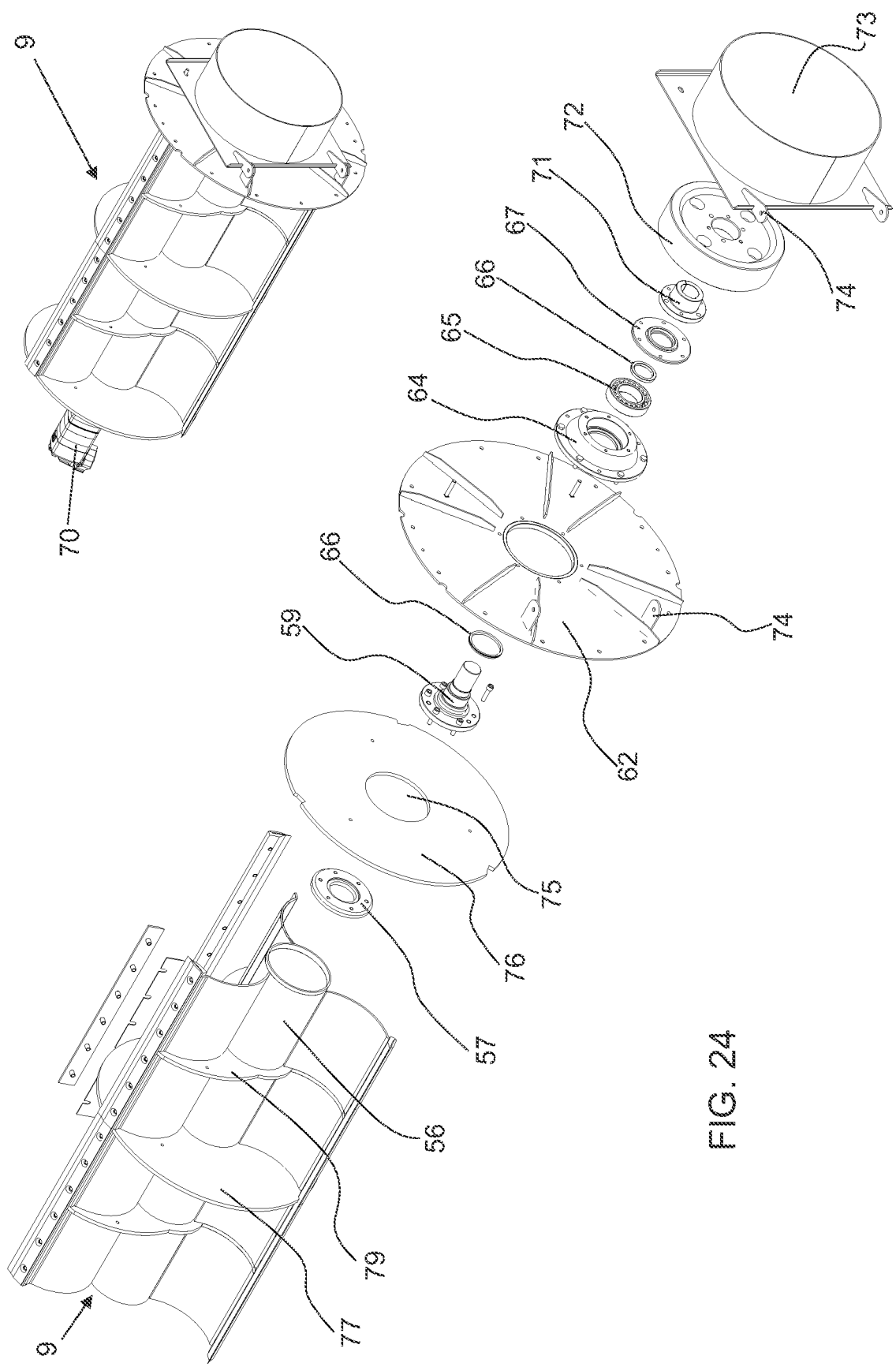
FIG. 24 also shows a reference perspective view, and a detailed magnified perspective view, as shown by FIG. 22, showing in further detail the side with the steering wheel/counterweight.
Figure 25:
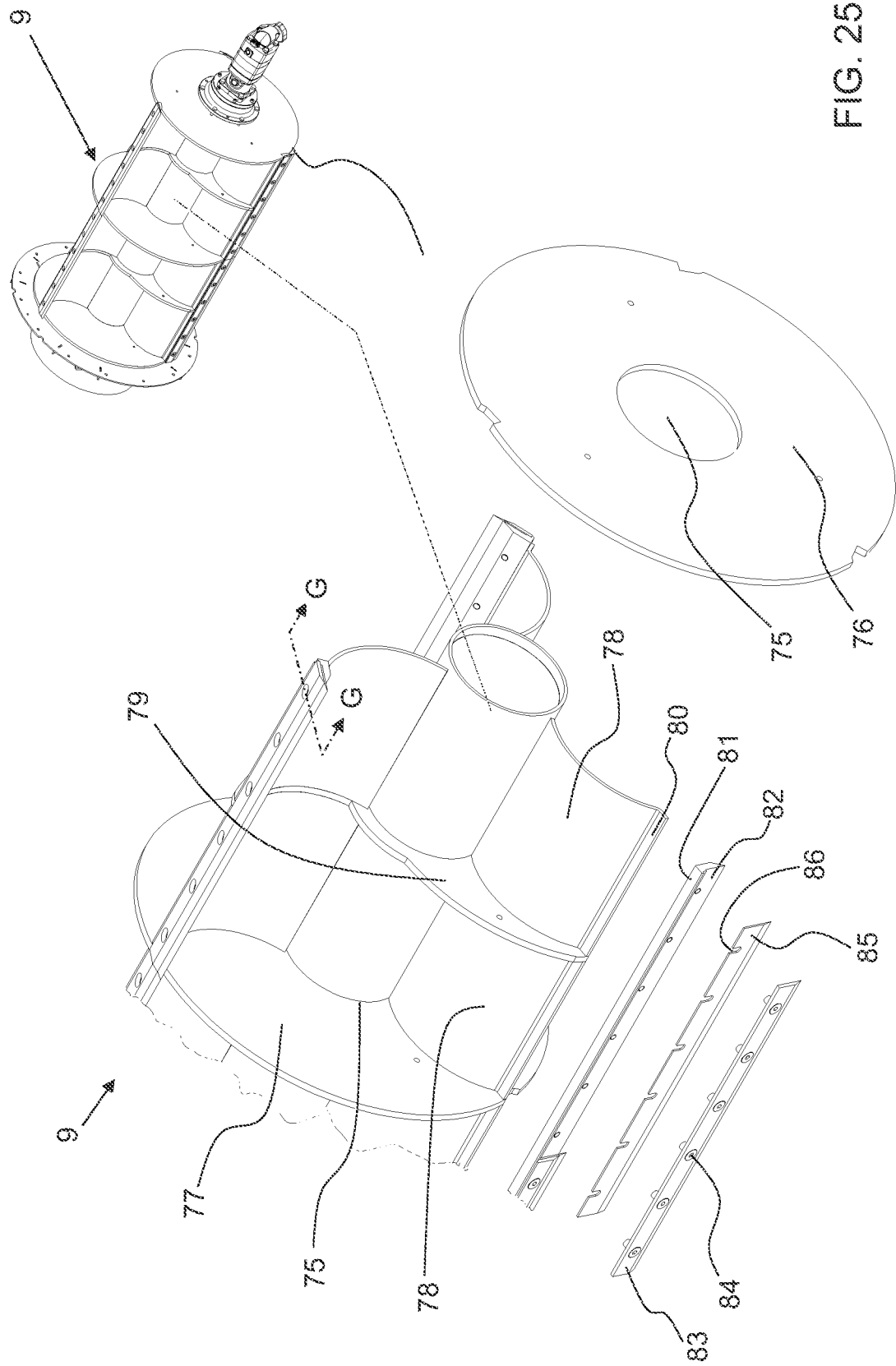
FIG. 25 shows a reference view of the rotating blade assembly, and a detailed, partially exploded, magnified, perspective view of the rotating blade assembly.
Figure 26:
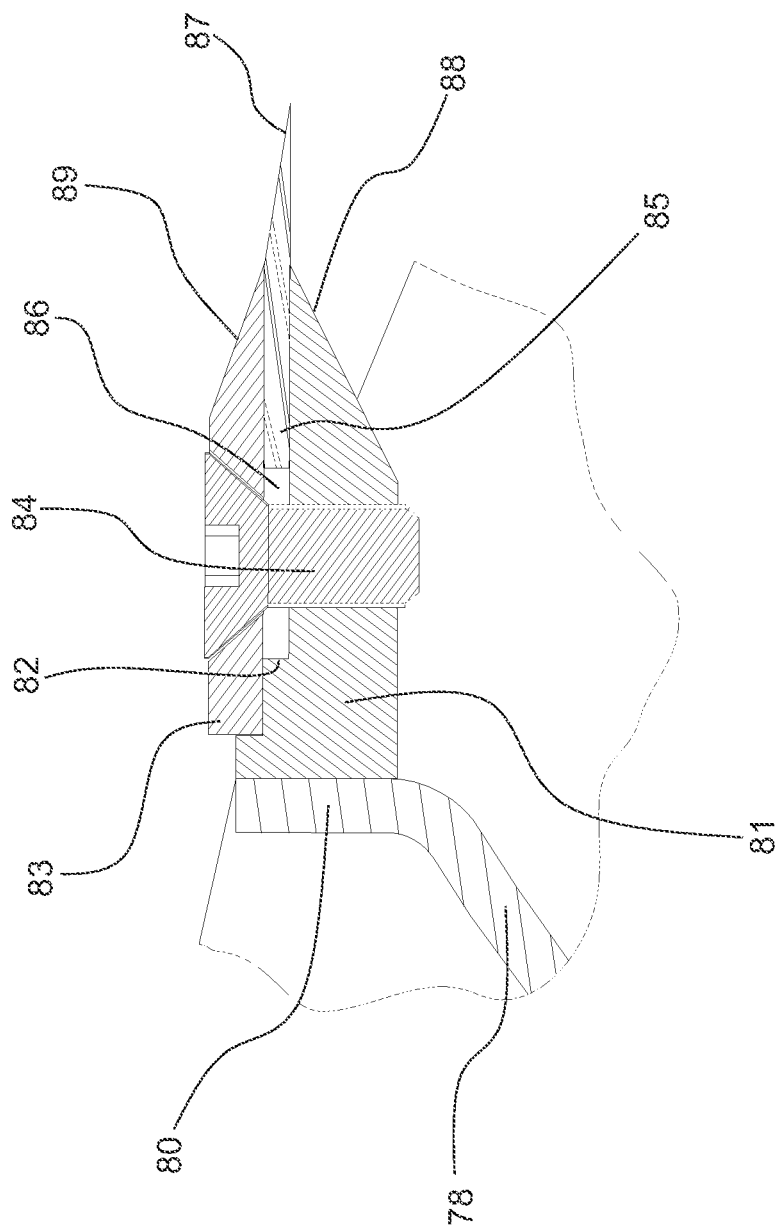
FIG. 26 is a magnified view of the "G-G" cut, shown in FIG. 25, showing in detail the components forming the cutting part of the rotating blade assembly.

FIGS. 16 and 17 show in detail the arrangement of the fixed shearbar (6), wherein we verify that it is formed by a substantially box-shaped structure with rectangular cross section defined by two L-shaped profiles, wherein a first L-shaped profile (51a) and a second L-shaped profile (51b) are fixed to each other in an opposed way around internal plates (51c). The lower flap of the second L-shaped profile (51b) distributes access openings (51d) between the internal plates (51c). The upper rear apex of the box-shaped structure is completed by an angle bracket (52a). The angle bracket (52a) forms a structural complement to join both L-shaped profiles (51a) and (51b) and configures a fixing plane (53a) over one of its flaps for the fixed shearbar. The fixing plane (53a) and the angle bracket (52a) distribute rows of circular fixing holes (53b) and oblong fixing holes (52b). A series of small fixing plates (55) are positioned beneath the angle bracket (52a). Each small fixing plate (55) is the length of the distance between two adjacent circular fixing holes (53b) with a hole at each end that aligns with a circular fixing hole (53b) and an oblong fixing hole (52b). Shearbar screws (54a) are inserted through the circular fixing holes (53b) in the fixing plane (53a), the oblong fixing holes (52b) in the angle bracket (52a), and through the holes in the small fixing plates and are secured with shearbar nuts (54b).

FIGS. 18 to 24 show in detail the rotating blade assembly (9), formed by a tubular hub (56). The edges of the tubular hub (56) connect to an internal flange (57) on each side. A first shaft (58) is fixed to one internal flange (57) and a second shaft (59) is fixed to the other internal flange (57). The first shaft (58) is secured to the first side panel (11) through a first blade assembly hole (60) in the first side panel (11). The second shaft (59) is secured to the second side panel (12) through a second blade assembly hole (61) in the second side panel (12). The first blade assembly hole (60) is reinforced by a first circular reinforcement (63). The second blade assembly hole (61) is reinforced by a third circular reinforcement (63') and a second circular reinforcement (62). Each of the shafts (58) and (59) pass through a shaft housing (64) for shaft bearings (65) and elastic sealing rings (66), which is sealed by a cap (67). The first shaft (58) has a fitting (68) for coupling a driven shaft (69) of a hydraulic motor (70). The second shaft (59) receives a flanged constituent (71) constituting fixation means for a stirring wheel (72) which, is embedded in a circular protective cover (73) assembled jointly with hinges (74) fixed to the second circular reinforcement (62).

Figure 27:
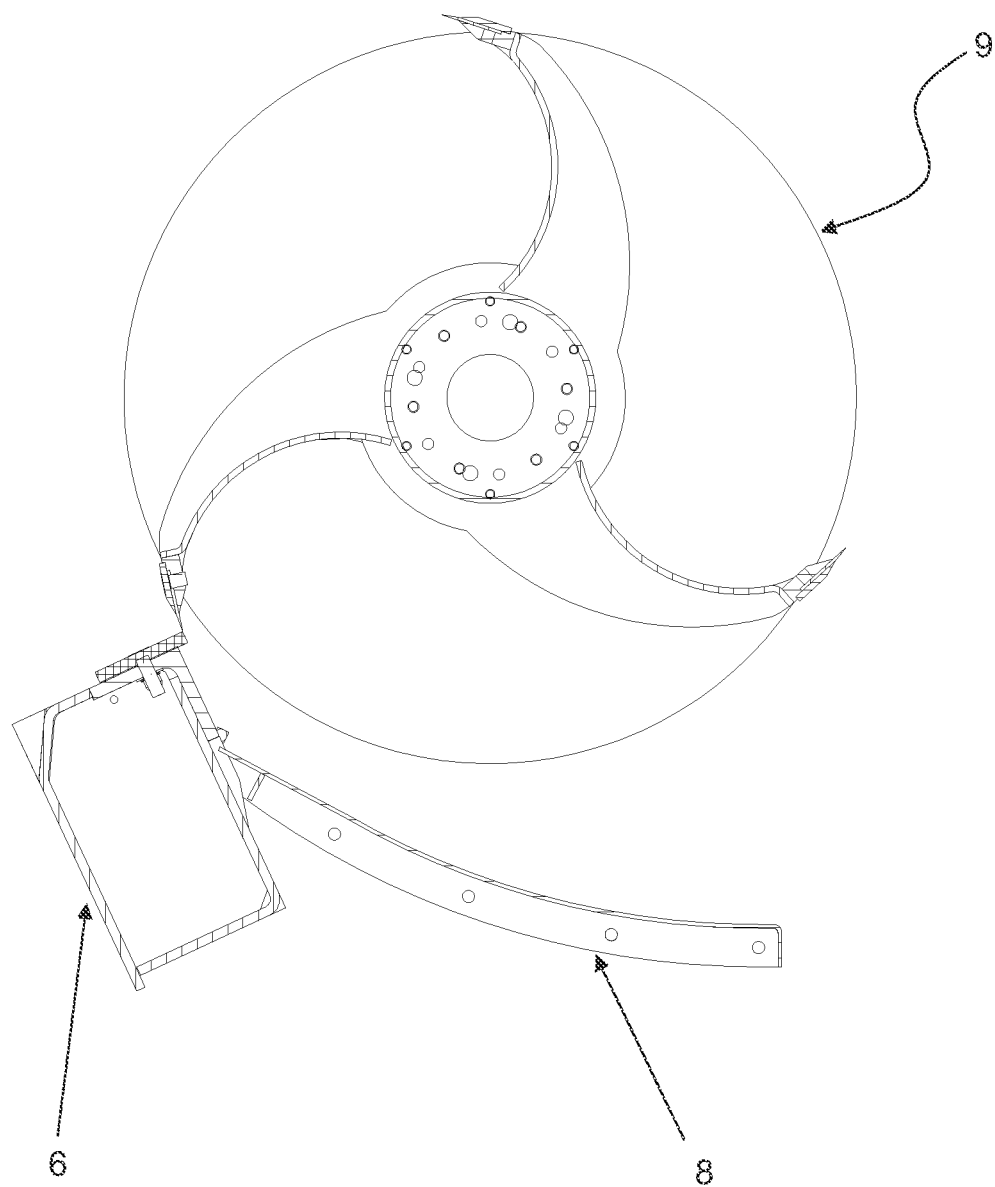
FIG. 27 shows a crosswise cutting view of only the fixed shearbar and the rotating blade assembly, highlighting the fact that the second view has various cutting lines, like a propeller, crossing the shearbar to re-align the cut of the plant.
Figure 28:
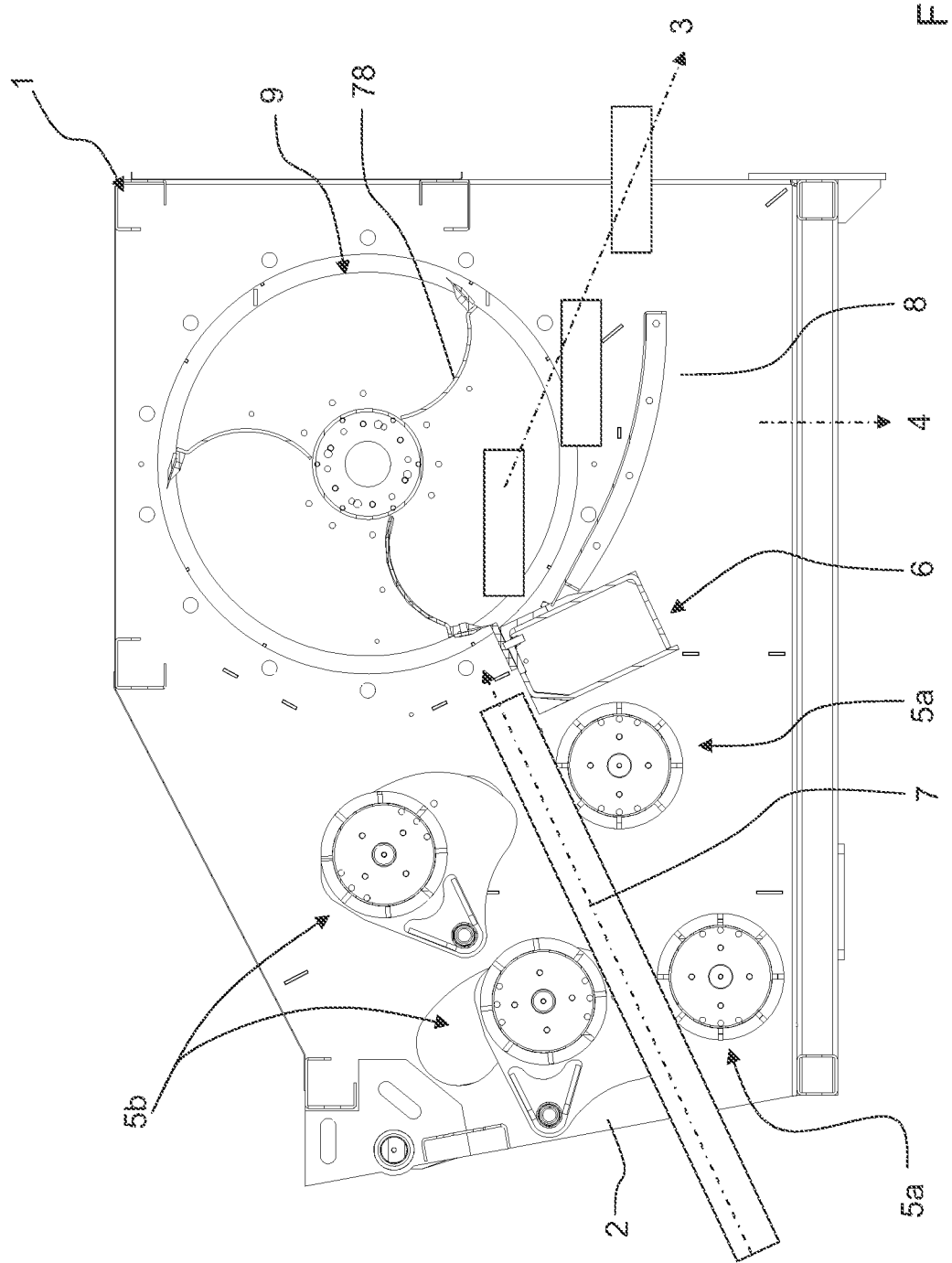
FIG. 28 shows the same view of the "A-A" cut as shown by FIG. 2, but with illustrative details of the operation of the device.

Further, with reference to the prior module, and referring to FIGS. 24 to 27, the edges of the tubular hub (56) are also fitted and fixed into central holes (75) of a first disc and a second disc (76) on the edges of the tubular hub (56) There is also a third disc (77) on the middle section of the tubular hub (56). Curved plates (78) and arched plates (79) are radially positioned along the tubular hub (56), wherein the curved plates are perpendicular to the discs (76) and (77) and the arched plates are parallel to the discs (76) and (77). The curved plates (78) have short straight edges (80), wherein a blade holder (81) is welded. The blade holder (81) has a recess (82) facing outward from the curved plates (78). Fastening strips (83) are fixed by a row of screws (84) to the recess (82), forming a house for blade segments (85). The blade segments (85) include various coincident slots (86) for the row of screws (84). The outward edges of the blade segments (85) are sharpened on a bevel, forming a first cutting edge (87). The blade holder (81) and the fastening strip (83) are also sharpened on a bevel to form a second cutting edge (88) on the blade holder (81) and a third cutting edge (89) on the fastening strip (83). The cutting edges (87), (88), and (89) are inversely combined to form a strong cutting front. As shown by FIGS. 27 and 28, the strong cutting front passes next to the fixed shearbar (6), and the plants passing through said parts are consequently cut with precision and efficiency.

Finally, with reference to the prior module, and referring to FIG. 28, the cutting process occurs in synchronism with the pulling rollers (5a-5b) and the displacement of the cut billets rearwards. Accordingly, the rollers (5a) and (5b) grasp the plants to be cut and displace them rearwards, pushing them along the passageway (7) and between the fixed shearbar (6) and the rotating blade assembly (9). At this point, plants are cut and, simultaneously, the curved plates (78) push the cut billets onto the slide (8), throwing the cut billets to the rear outlet (3) establishing a continuous process. Residues, such as earth and other particles released from the plants fall freely through the lower outlet (4).

Figure 29:
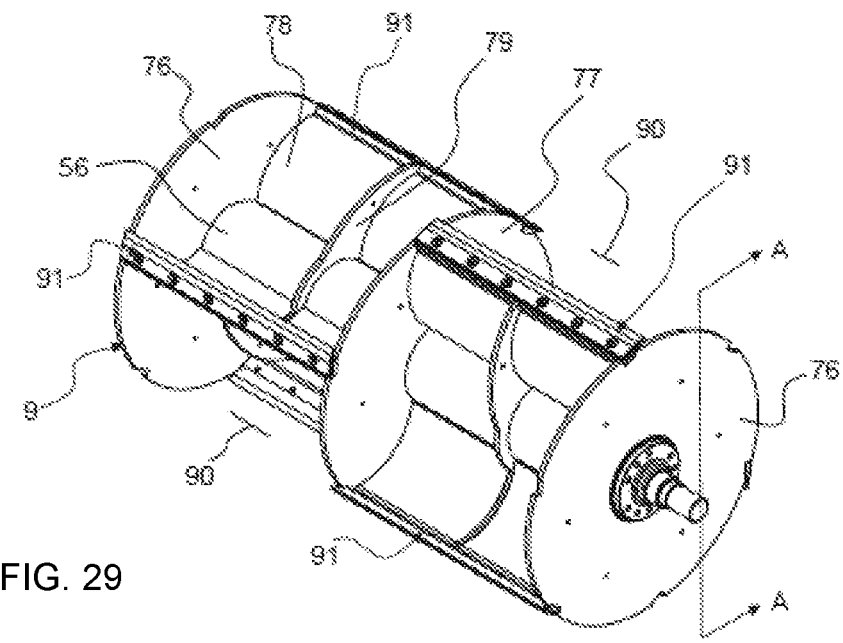
FIG. 29 shows an isometric view of the rotating cutting set (9) of the improved module of the present invention.
Figure 30:
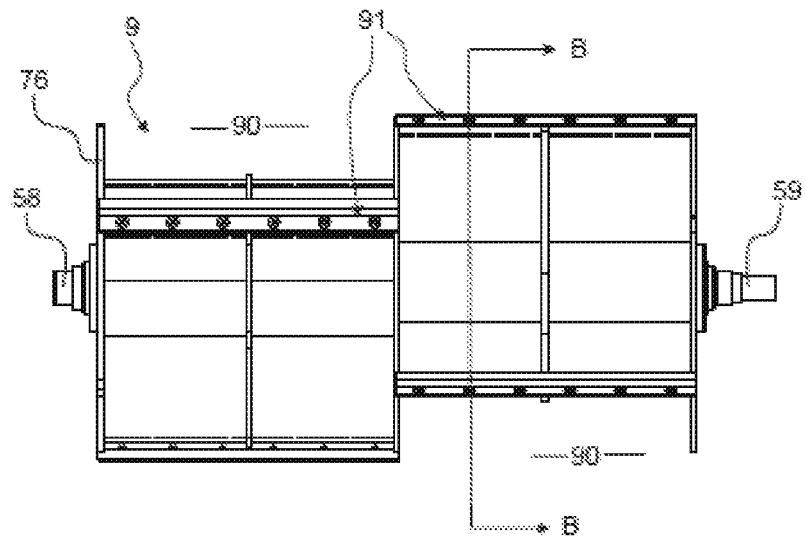
FIG. 30 shows a lengthwise cutting view of the rotating cutting set (9).
Figure 31:
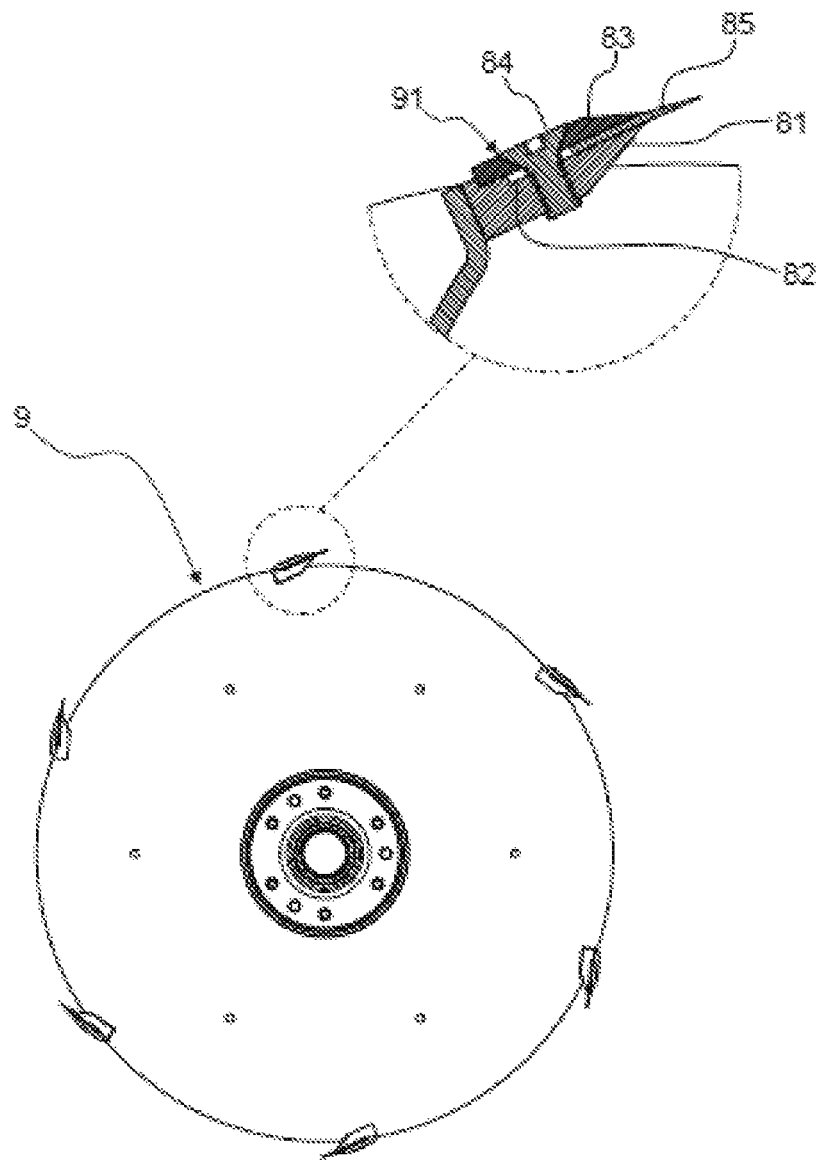
FIG. 31 is a crosswise cutting view of the rotating cutting set (9) and an enlarged detail of the cutting knife.

Applicant has now improved upon the prior module as discussed above and shown in drawing FIGS. 1-28 by providing a new module which has the improvements as shown in particular in drawing FIGS. 29-31 and their details as provided herein. The chopping module of the present invention comprises, as was shown in the prior embodiment, in particular FIGS. 1-4:

an ordinarily parallelepiped box-shaped body (1), with three open sides, the first one forming a front inlet (2) of the plant to be chopped, the second one forming a rear outlet (3) for the chopped plant, and the third one forming a lower outlet (4) for residues;

soon after the inlet opening (2), two crosswise pairs of traction rotating rollers for the plants to be chopped are located, being one lower pair of idler rollers (5a) and an upper pair of floating rollers (5b);

after the set of rollers (5a) and (5b) is assembled crosswise, the fixed counter knife set (6), which upper side is aligned to the diameters of the lower idler rollers (5a), forms a passageway (7) for the plants to be chopped between those and the upper floating rollers (5b) and, after the fixed counter knife (6), that passageway continues itself as a ramp (8) sloping downwards towards the outlet (3) for the chopped plants; and a crosswise rotating knife set (9), located above the ramp (7) and adjacent to the fixed counter knife (6).

The modifications of the present chopping module are shown in particular in FIGS. 29 to 31. The drawing FIGS. 29-31 show the rotating cutting set (9), wherein despite having been modified, the present invention still comprises the same constituents of the prior module, starting by the tubular center (56) having its edges with axis tips (58) and (59) with bearings on the sides of the box (1), and the edges of the tubular center (56) have discs (76), between which another identical disc (77) is repeated at least once, forming at least two lengthwise sections (90), wherein each section forms a structure for various parts of curved and radially located plates (78) and (79), all of which with their edges aligned to the external diameter of the discs (76) and (77), where they receive cutting segments (91) which do not extend themselves throughout the length of the set, but, as in the main application, they are equally defined by blade carriers (81), recesses (82) and pressing rulers (83) fixed by rows of screws (84), forming, between the latter and the first one (81), housing for cutting blade segments (85).

In the improved version as described and illustrated in this application, the present invention includes features wherein each cutting segment (91) is extending itself to each lengthwise section (90) formed between the discs (76) and (77), wherein the segments (91) of a section (90) are lagged or are not aligned lengthwise to those of the adjacent section.

As can be observed in the figures, lengthwise cutting segments (91) for each section (90) are lagged to each other, so that, while cutting (rotation), each cutting segment (91) reaches a respective length of the counter knife (6) and the following extension is only reached by the following segment after the first one has already made the cut, and so on. With this embodiment, the set allows for considerable reduction in cutting forces or pressure, consequently allowing for smooth operation and considerably increasing the speed and the working life of the set.

What is claimed is:

1. A chopping module comprising a box-shaped body, comprising, a front inlet; a rear outlet, and a lower outlet; a lower pair of stationary rollers positioned crosswise adjacent to the front inlet; an upper pair of floating rollers positioned crosswise adjacent to the front inlet and above the lower pair of stationary rollers; a fixed shearbar positioned crosswise adjacent to the lower pair of stationary rollers, and a rotating blade assembly positioned crosswise adjacent to the fixed shearbar; wherein the front inlet receives harvested plants to be chopped plant;

wherein, a passageway for the plants to be chopped is defined between the upper pair of floating rollers and the lower pair of stationary rollers; and wherein, a slide is positioned adjacent to the fixed shearbar and below the rotating blade assembly which guides chopped plants to the rear outlet, and wherein the lower outlet receives the residues from the slide;

wherein the rotating blade assembly comprises a tubular hub; a first internal flange; a second internal flange; a first shaft; a second shaft; a first shaft housing; a second shaft housing; a first shaft bearing; a second shaft bearing; a first set of elastic sealing rings; a second set of elastic sealing rings; a first cap; a second cap; a hydraulic motor with a driven shaft; a flanged constituent; a stirring wheel; a circular protective cover; one or more hinges; a first disc; a second disc; a third disc; a plurality of curved plates, and a plurality of arched plates;

wherein, the first side panel contains a first blade assembly hole and the second side panel contains a second blade assembly hole; wherein, the first blade assembly hole is reinforced by a first circular reinforcement on the outside of the first side panel; wherein, the second blade assembly hole is reinforced by a second circular reinforcement on the outside of the second side panel; wherein, the second blade assembly hole is further reinforced by a third circular reinforcement on the inside of the second side panel; wherein, the first cap is secured to the first shaft housing and the first shaft housing is secured to the first shaft; wherein, the first set of elastic sealing rings and the first shaft bearings are secured between the first shaft housing and the first shaft; wherein, the second cap is secured to the second shaft housing and the second shaft housing is secured to the second shaft; wherein, the second set of elastic sealing rings and the second shaft bearings are secured between the second shaft housing and the second shaft; wherein, the first shaft has a fitting which couples to the driven shaft of the hydraulic motor; wherein, the hydraulic motor is secured to the first cap; wherein, the second shaft couples with the flanged constituent; wherein, the flanged constituent is fixed to the stirring wheel; wherein, the stirring wheel is embedded in the circular protective cover; wherein, the circular protective cover is secured to the second circular reinforcement with the one or more hinges; wherein, a first edge of the tubular hub is secured to the first internal flange and the first internal flange is fixed to a central hole of the first disc; wherein, a second edge of the tubular hub is secured to the second internal flange and the second internal flange is fixed to a central hole of the second disc; wherein, the third disc is situated on the tubular hub between the first disc and the second disc; wherein, the curved plates are distributed radially along the tubular hub perpendicular to the first disc, the second disc, and the third disc; wherein, the arched plates are radially distributed along the tubular hub parallel to the first disc, the second disc, and third disc; wherein, each of the curved plates has a short straight edge; wherein, each short straight edge has a blade holder welded to it; wherein each blade holder has a recess and a fastening strip which is fixed to the blade holder by a row of screws forming a housing for blade segments between the blade holder and the fastening strip; wherein, each blade segment includes a plurality of coincident slots receiving the row of screws; wherein, an outside edge of each blade segment is sharpened on a bevel to form a first cutting edge; wherein, an outside edge of each blade holder is sharpened on a bevel to form a second cutting edge; wherein, an outside edge of each fastening strip is sharpened on a bevel to form a third cutting edge; wherein, on each short straight edge, the first cutting edge, the second cutting edge, and the third cutting edge are arranged complementary to each other to form a strong cutting front; and wherein, each strong cutting front passes adjacent to the fixed shearbar when the rotating cutting assembly is in operation; and wherein each cutting segment is extending itself according to a length corresponding to the lengthwise section formed between one disc and at least an intermediate disc.

2. A chopping module comprising a box-shaped body, comprising, a front inlet; a rear outlet, and a lower outlet; a lower pair of stationary rollers positioned crosswise adjacent to the front inlet; an upper pair of floating rollers positioned crosswise adjacent to the front inlet and above the lower pair of stationary rollers; a fixed shearbar positioned crosswise adjacent to the lower pair of stationary rollers, and a rotating blade assembly positioned crosswise adjacent to the fixed shearbar; wherein the front inlet receives harvested plants to be chopped plant;

wherein, a passageway for the plants to be chopped is defined between the upper pair of floating rollers and the lower pair of stationary rollers; and wherein, a slide is positioned adjacent to the fixed shearbar and below the rotating blade assembly which guides chopped plants to the rear outlet, and wherein the lower outlet receives the residues from the slide;

wherein the rotating blade assembly comprises a tubular hub; a first internal flange; a second internal flange; a first shaft; a second shaft; a first shaft housing; a second shaft housing; a first shaft bearing; a second shaft bearing; a first set of elastic sealing rings; a second set of elastic sealing rings; a first cap; a second cap; a hydraulic motor with a driven shaft; a flanged constituent; a stirring wheel; a circular protective cover; one or more hinges; a first disc; a second disc; a third disc; a plurality of curved plates, and a plurality of arched plates;

wherein, the first side panel contains a first blade assembly hole and the second side panel contains a second blade assembly hole; wherein, the first blade assembly hole is reinforced by a first circular reinforcement on the outside of the first side panel; wherein, the second blade assembly hole is reinforced by a second circular reinforcement on the outside of the second side panel; wherein, the second blade assembly hole is further reinforced by a third circular reinforcement on the inside of the second side panel; wherein, the first cap is secured to the first shaft housing and the first shaft housing is secured to the first shaft; wherein, the first set of elastic sealing rings and the first shaft bearings are secured between the first shaft housing and the first shaft; wherein, the second cap is secured to the second shaft housing and the second shaft housing is secured to the second shaft; wherein, the second set of elastic sealing rings and the second shaft bearings are secured between the second shaft housing and the second shaft; wherein, the first shaft has a fitting which couples to the driven shaft of the hydraulic motor; wherein, the hydraulic motor is secured to the first cap; wherein, the second shaft couples with the flanged constituent; wherein, the flanged constituent is fixed to the stirring wheel; wherein, the stirring wheel is embedded in the circular protective cover; wherein, the circular protective cover is secured to the second circular reinforcement with the one or more hinges; wherein, a first edge of the tubular hub is secured to the first internal flange and the first internal flange is fixed to a central hole of the first disc; wherein, a second edge of the tubular hub is secured to the second internal flange and the second internal flange is fixed to a central hole of the second disc; wherein, the third disc is situated on the tubular hub between the first disc and the second disc; wherein, the curved plates are distributed radially along the tubular hub perpendicular to the first disc, the second disc, and the third disc; wherein, the arched plates are radially distributed along the tubular hub parallel to the first disc, the second disc, and third disc; wherein, each of the curved plates has a short straight edge; wherein, each short straight edge has a blade holder welded to it; wherein each blade holder has a recess and a fastening strip which is fixed to the blade holder by a row of screws forming a housing for blade segments between the blade holder and the fastening strip; wherein, each blade segment includes a plurality of coincident slots receiving the row of screws; wherein, an outside edge of each blade segment is sharpened on a bevel to form a first cutting edge; wherein, an outside edge of each blade holder is sharpened on a bevel to form a second cutting edge; wherein, an outside edge of each fastening strip is sharpened on a bevel to form a third cutting edge; wherein, on each short straight edge, the first cutting edge, the second cutting edge, and the third cutting edge are arranged complementary to each other to form a strong cutting front; and wherein, each strong cutting front passes adjacent to the fixed shearbar when the rotating cutting assembly is in operation; and wherein each cutting segment extends itself between two intermediate discs when the set includes two or more intermediate discs.

3. A chopping module comprising a box-shaped body, comprising, a front inlet; a rear outlet, and a lower outlet; a lower pair of stationary rollers positioned crosswise adjacent to the front inlet; an upper pair of floating rollers positioned crosswise adjacent to the front inlet and above the lower pair of stationary rollers; a fixed shearbar positioned crosswise adjacent to the lower pair of stationary rollers, and a rotating blade assembly positioned crosswise adjacent to the fixed shearbar; wherein the front inlet receives harvested plants to be chopped plant;

wherein, a passageway for the plants to be chopped is defined between the upper pair of floating rollers and the lower pair of stationary rollers; and wherein, a slide is positioned adjacent to the fixed shearbar and below the rotating blade assembly which guides chopped plants to the rear outlet, and wherein the lower outlet receives the residues from the slide;

wherein the rotating blade assembly comprises a tubular hub; a first internal flange; a second internal flange; a first shaft; a second shaft; a first shaft housing; a second shaft housing; a first shaft bearing; a second shaft bearing; a first set of elastic sealing rings; a second set of elastic sealing rings; a first cap; a second cap; a hydraulic motor with a driven shaft; a flanged constituent; a stirring wheel; a circular protective cover; one or more hinges; a first disc; a second disc; a third disc; a plurality of curved plates, and a plurality of arched plates;

wherein, the first side panel contains a first blade assembly hole and the second side panel contains a second blade assembly hole; wherein, the first blade assembly hole is reinforced by a first circular reinforcement on the outside of the first side panel; wherein, the second blade assembly hole is reinforced by a second circular reinforcement on the outside of the second side panel; wherein, the second blade assembly hole is further reinforced by a third circular reinforcement on the inside of the second side panel; wherein, the first cap is secured to the first shaft housing and the first shaft housing is secured to the first shaft; wherein, the first set of elastic sealing rings and the first shaft bearings are secured between the first shaft housing and the first shaft; wherein, the second cap is secured to the second shaft housing and the second shaft housing is secured to the second shaft; wherein, the second set of elastic sealing rings and the second shaft bearings are secured between the second shaft housing and the second shaft; wherein, the first shaft has a fitting which couples to the driven shaft of the hydraulic motor; wherein, the hydraulic motor is secured to the first cap; wherein, the second shaft couples with the flanged constituent; wherein, the flanged constituent is fixed to the stirring wheel; wherein, the stirring wheel is embedded in the circular protective cover; wherein, the circular protective cover is secured to the second circular reinforcement with the one or more hinges; wherein, a first edge of the tubular hub is secured to the first internal flange and the first internal flange is fixed to a central hole of the first disc; wherein, a second edge of the tubular hub is secured to the second internal flange and the second internal flange is fixed to a central hole of the second disc; wherein, the third disc is situated on the tubular hub between the first disc and the second disc; wherein, the curved plates are distributed radially along the tubular hub perpendicular to the first disc, the second disc, and the third disc; wherein, the arched plates are radially distributed along the tubular hub parallel to the first disc, the second disc, and third disc; wherein, each of the curved plates has a short straight edge; wherein, each short straight edge has a blade holder welded to it; wherein each blade holder has a recess and a fastening strip which is fixed to the blade holder by a row of screws forming a housing for blade segments between the blade holder and the fastening strip; wherein, each blade segment includes a plurality of coincident slots receiving the row of screws; wherein, an outside edge of each blade segment is sharpened on a bevel to form a first cutting edge; wherein, an outside edge of each blade holder is sharpened on a bevel to form a second cutting edge; wherein, an outside edge of each fastening strip is sharpened on a bevel to form a third cutting edge; wherein, on each short straight edge, the first cutting edge, the second cutting edge, and the third cutting edge are arranged complementary to each other to form a strong cutting front; and wherein, each strong cutting front passes adjacent to the fixed shearbar when the rotating cutting assembly is in operation; and wherein each cutting segment of a section is lagged or not aligned lengthwise to another segment of the adjacent section.

* * * * *